United States Patent [19]

Kaku et al.

[11] Patent Number: 4,868,850
[45] Date of Patent: Sep. 19, 1989

[54] MODEM COMMUNICATION SYSTEM HAVING TRAINING MEANS AND METHOD FOR TRAINING SAME

[75] Inventors: Takashi Kaku, Tama; Yasuhiro Arai, Kawasaki, both of Japan

[73] Assignee: Fujitsu Limited, Kawasaki, Japan

[21] Appl. No.: 870,499

[22] Filed: Jun. 4, 1986

[30] Foreign Application Priority Data

Jun. 4, 1985 [JP] Japan .................. 60-120840

[51] Int. Cl.[4] .................. H03H 7/30; H04B 1/38
[52] U.S. Cl. .................. 375/13; 375/8; 340/825.08
[58] Field of Search .................. 375/11, 12, 13, 14, 375/15, 106, 58, 76, 7, 8; 340/825.08

[56] References Cited

U.S. PATENT DOCUMENTS

| | | | |
|---|---|---|---|
| 2,861,257 | 11/1958 | Weintraub | 375/23 |
| 3,962,637 | 6/1976 | Motley et al. | 375/14 |
| 4,238,849 | 12/1980 | Gassmann | 370/110.4 |
| 4,462,108 | 7/1984 | Miller | 375/13 |
| 4,571,733 | 2/1986 | Kaku et al. | 375/13 |
| 4,577,328 | 3/1986 | Senoo | 375/13 |
| 4,597,089 | 6/1986 | Motley et al. | 375/13 |
| 4,638,496 | 1/1987 | Jensen | 375/58 |

FOREIGN PATENT DOCUMENTS 0147262 9/1983 Japan .................. 375/106

Primary Examiner—Robert L. Griffin
Assistant Examiner—Andrew J. Telesz, Jr.
Attorney, Agent, or Firm—Staas & Halsey

[57] ABSTRACT

A multipoint type MODEM communication system having a training device for adapting receiving parameters in a receiving MODEM to a characteristic of a telephone line connected to a sending MODEM in response to a training signal sent from the sending MODEM prior to the reception of data. The training signal includes a tone for gain control, a timing signal for pull-in synchronization, and at least two impulses for equalization and carrier phase control, which are superimposed on each other. A time between the first and the last impulses defines the characteristic of the telephone line which should be adjusted in the receiving MODEM.

Additional guard impulses may be added prior to and/or after the impulses. A scramble signal also may be added after the impulses.

In addition, a method for training the receiving MODEM is disclosed.

12 Claims, 22 Drawing Sheets

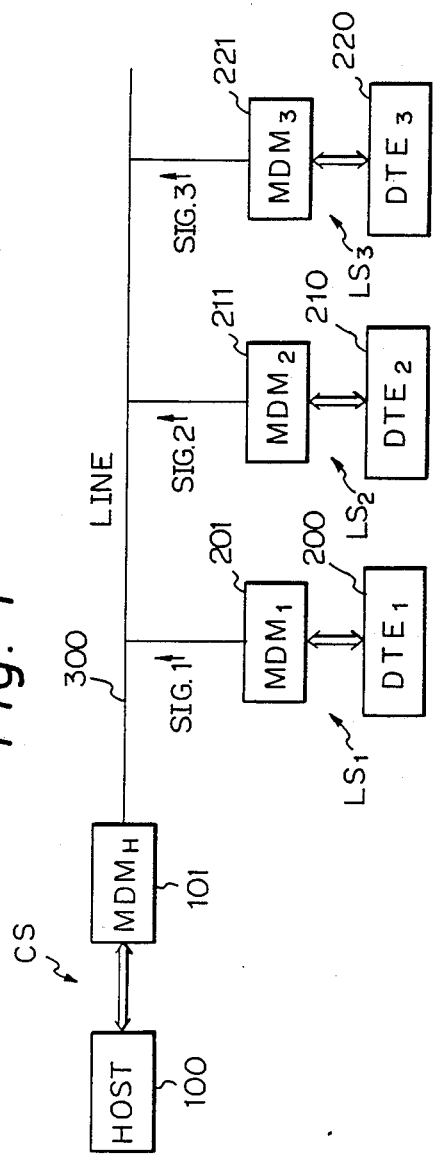
Fig. 1
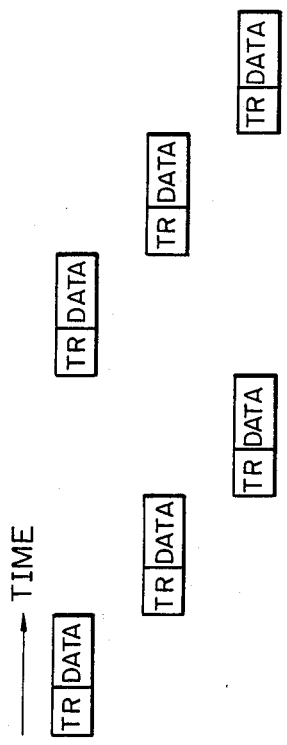
Fig. 2a
Fig. 2b
Fig. 2c

*Fig. 3a*
HOST, DTE — MODEM
——————→ RS
CS ←——————
——————→ SD
ST2 ←——————
*Fig. 3b*
HOST, DTE — MODEM
CD ←——————
RD ←——————
RT ←——————
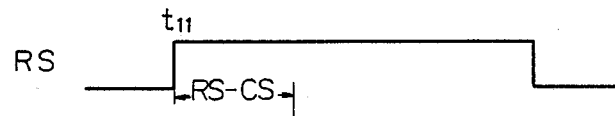
*Fig. 4a* RS
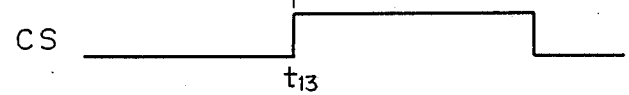
*Fig. 4b* CS
*Fig. 4c* SIG. 1     TR | DATA
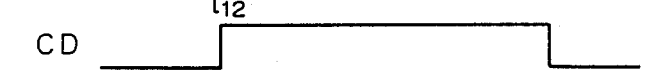
*Fig. 4d* CD
*Fig. 4e* RD

TRAINING SIG. PATTERN

IMPULSE RECOVERY

Fig. 14

| IN | | | | | SEG1 | | | | | | SEG2 | | | | | |
|---|---|---|---|---|---|---|---|---|---|---|---|---|---|---|---|---|
| | A | B | A | B | A | B | A | B | $X_1$ | $X_2$ | $X_3$ | $X_4$ | $X_5$ | $X_6$ | | |
| SX1 | | A | B | A | B | A | B | A | B | $X_1$ | $X_2$ | $X_3$ | $X_4$ | $X_5$ | $X_6$ | |
| SX2 | A | B+A | A+B | B+A | A+B | B+A | A+B | B+A | $X_1+B$ | $X_2+X_1$ | $X_3+X_2$ | $X_4+X_3$ | $X_5+X_4$ | $X_6+X_5$ | $X_6$ | |
| SX3 | | A | B+A | A+B | B+A | A+B | B+A | A+B | B+A | $X_1+B$ | $X_2+X_1$ | $X_3+X_2$ | $X_4+X_3$ | $X_5+X_4$ | $X_6+X_5$ | $X_6$ |
| OUT | A | B | 0 | 0 | 0 | 0 | 0 | 0 | $X_1-A$ | $X_2-B$ | $X_3-X_1$ | $X_4-X_2$ | $X_5-X_3$ | $X_6-X_4$ | $-X_5$ | $-X_6$ |

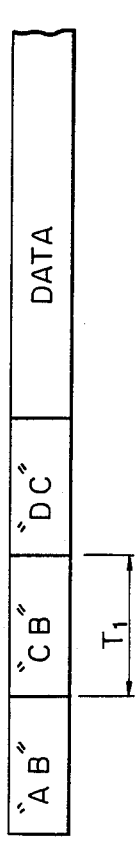
Fig.15a  SIG.11
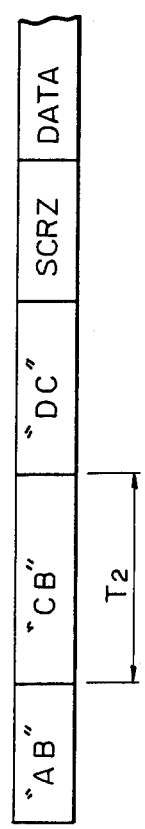
Fig.15b  SIG.12
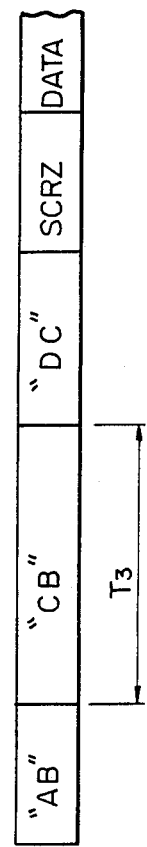
Fig.15c  SIG.13

|  | 7.5ms | 15 ms | 30 ms | 60 ms |
|---|---|---|---|---|
| FIRST IMPULSE | YES | YES | YES | YES |
| SECOND IMPULSE | NO | YES | YES | YES |
| SCRZ | NO | NO | YES | YES |

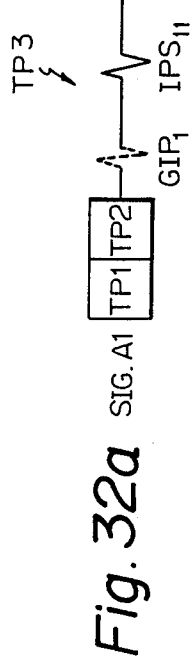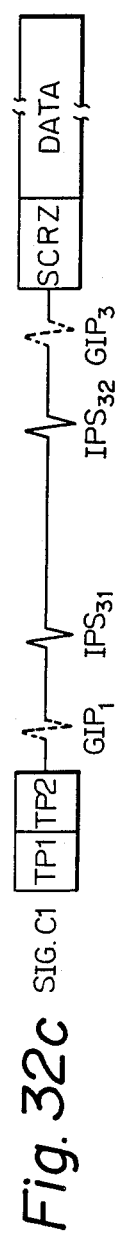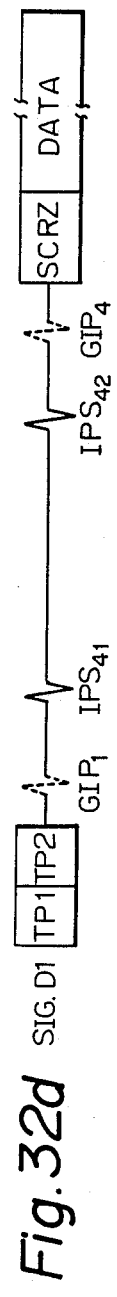
Fig. 32a  SIG. A1
Fig. 32b  SIG. B1
Fig. 32c  SIG. C1
Fig. 32d  SIG. D1

MODEM COMMUNICATION SYSTEM HAVING TRAINING MEANS AND METHOD FOR TRAINING SAME

BACKGROUND OF THE INVENTION

1. Field of the Invention

The present invention relates to a modulator and demodulator (MODEM) communication system. More particularly, it relates to a multipoint type MODEM communication system having training means for adapting a receiving MODEM to a characteristic of a MODEM communication line, and a method for training the same.

2. Description of the Related Art

MODEM communication systems using telephone lines as communication lines are extensively known. The MODEM communication systems are categorized into two types; a point-to-point system in which a pair of MODEMs are connected through the telephone line, and a multipoint system in which a MODEM is connected to a plurality of MODEMs through a common telephone line. The point-to-point system has the advantages of a simple circuit construction for the MODEM and a simple communication protocol between the MODEMs. However, if a system is required in which a large number of MODEMs are provided and connected to each other, the point-to-point system has the disadvantages of many lines in use, with corresponding high line-use fees, etc. The multipoint system solves these problems because a single telephone line is commonly used for the plurality of MODEMs, reducing the line-use fees and the construction costs. The present invention essentially relates to the multipoint MODEM communication system.

In the multipoint MODEM communication system, however, a process known in the art as "TRAINING", which will be described later in detail, is indispensable and must be carried out prior to the reception of data on the line. Briefly, the training process is that wherein a receiving MODEM adjusts control parameters therein in response to a training signal from a sending MODEM to ensure the reception of data. In the multipoint MODEM communication system, distances between a center station (CS) and the plurality of local stations (LS) are not constant, and accordingly, a characteristic of the line, for example, phase jitter, between the CS and one LS is not equal to that of a line between the CS and another LS, and thus, for example, the receiving MODEM in the CS, per se, must adjust reception parameters therein to match the line connected to the sending MODEM in the LS, prior to the reception of data from the sending MODEM.

In general, a high speed transfer on the telephone line may result in a short transfer time for the same amount of data transfer. In the multipoint MODEM communication system, however, this is not always true because a considerable length of time is required for the training. Namely, the high speed transfer will require, for example, a fine adjustment of the parameters in the receiving MODEM, and this fine adjustment may require a large amount of training information and the training may take a long time. For example, according to CCITT recommendations, the training time should be within 50 ms for a 4800 bit per second (bps) transfer line (CCITT V. 27 bis), 253 ms for a 9600 bps transfer line (CCITT V. 29), and 1393 ms for 14.4 Kbps transfer line (CCITT U. 33). If only a small amount of data is to be transferred, the time needed for the training may be longer than the time needed for the data transfer. As a result, the transfer time containing the training time and the data transfer time in the high speed transfer line may be longer than the transfer time in the low speed transfer line. To eliminate this paradox, the training time must be reduced. Shortening the training time will bring a high transfer efficiency on the line, and accordingly, reduce the line-use fees.

A variety of training methods for shortening the training time have been proposed. The prior art training methods, however, still suffer from the disadvantage of a long training time.

SUMMARY OF THE INVENTION

An object of the present invention is to provide an improved multipoint type MODEM communication system having a training means and a reduced training time.

Another object of the present invention is to provide an improved multipoint type MODEM communication system having the above features and applicable to a high speed data transfer line.

Still another object of the present invention is to provide an improved training method applicable to the above improved multipoint type MODEM communication system.

Yet another object of the present invention is to realize the above objects without increasing the cost of the system, particularly the MODEM.

According to the present invention, there is provided a modulator and demodulator (MODEM) communication system including: a telephone line device having a telephone line; a central station including a MODEM and operatively connected to the telephone line through the MODEM; and, one or more local stations each including another MODEM, and operatively connected to the telephone line through the other MODEM and to the central station through the other MODEM, the telephone line, and the central station MODEM. The central station MODEM carries out a polling of the other MODEMs. The corresponding other MODEM undergoing the polling sends a signal including a training signal and data to the central station MODEM. The training signal sent from the other MODEM contains a carrier, a timing signal, and at least two impulses, a time between the two impulses defining a characteristic of the telephone line between the corresponding other MODEM and the central station MODEM. The central station MODEM includes a first unit for receiving and demodulating the signal including the training signal, a second unit for detecting the carrier and the timing signal, and performing a gain control and a pulling-in synchronization to the corresponding other MODEM, and a third unit for recovering the impulses and for performing an equalization and a carrier phase control in response to the recovered impulses. The data contained in the signal sent from the corresponding other MODEM is adjusted in response to the adjusted gain, synchronization, equalization, and carrier phase.

The training signal sent from the other MODEM may be superimposed on the carrier, the timing signal, and the impulses. The training signal may contain a forward impulse prior to the impulses, for guarding the impulses. The training signal may also contain a scramble signal having a random pattern data, after the impulses. The training signal may further contain a reverse impulse between the last impulse and the scramble signal.

The second unit of the central station MODEM includes a circuit for detecting the carrier, a circuit for controlling a gain, a circuit for extracting the timing signal, and a circuit for rotating a phase of the extracted timing signal.

The third unit of the central station MODEM includes a circuit for recovering the received impulses, a circuit for equalizing a characteristic to the other MODEM, and a circuit for controlling a carrier phase to the other MODEM.

Conversely, the training signal sent from the other MODEM may contain the carrier, the timing signal, and the impulses in series. The training signal may further contain a forward impulse between the timing signal and the first impulse, for guarding the impulses. The training signal may also contain a scramble signal having a random pattern data after the impulses. The training signal may further contain a reverse impulse between the last impulse and the scramble signal.

The second unit of the other MODEM includes a circuit for detecting the carrier, a circuit for controlling a gain, and a circuit for extracting the timing signal and pulling-in the synchronization. The third unit of the other MODEM includes a circuit for recovering the received impulses, a circuit for equalizing a characteristic to the other MODEM, and a circuit for controlling a carrier phase to the other MODEM.

The signal sent from the other MODEM may be a quadrature-amplitude-modified signal.

According to another aspect of the present invention, there is provided a method for training a MODEM in a MODEM communication system including a telephone line device having a telephone line, a central station including a MODEM operatively connected to the telephone line and one or more local stations each including another MODEM operatively connected to the telephone line, including the steps of: carrying out polling from the MODEM in the central station to the other MODEMs in the local station through the telephone line; sending a signal having a training signal containing a carrier, a timing signal and at least two impulses and data, from the polled MODEM to the central MODEM through the telephone line, a time between the impulses defining a characteristic of the telephone line between the polled MODEM and the central MODEM; receiving and demodulating the training signal in the central MODEM; detecting the carrier and the timing signal in the central MODEM to adjust a gain and to pull-in synchronization to the polled MODEM; and recovering the impulses and performing an equalization and carrier phase control in response to the time of the recovered impulses.

The training signal may be formed as any one of the signals set forth above.

The method for training a MODEM may further include the steps of discriminating the scramble signal, and adjusting the equalization and carrier phase control.

BRIEF DESCRIPTION OF THE DRAWINGS

Other objects and features of the present invention will be described below in detail with reference to the accompanying drawings, in which:

FIG. 1 is a block diagram of a multipoint type MODE communication system to which the present invention is applied;

FIGS. 2a to 2c are timing charts of signals from the local stations (LSs) in FIG. 1 to the central station (CS) in FIG. 1;

FIGS. 3a and 3b are views of a signal interface between the host computer or the data terminal and the MODEM;

FIGS. 4a to 4e are timing charts of the data transfer from the LS to the CS;

FIG. 14 is a table explaining the impulse recovery of FIG. 13;

FIGS. 15a to 15c are views of the training signal patterns of the embodiment;

FIGS. 32a to 32d are waveforms of the training signals shown in FIG. 31, corresponding to FIGS. 9a to 9d;

DESCRIPTION OF THE PREFERRED EMBODIMENTS

Figure 5:
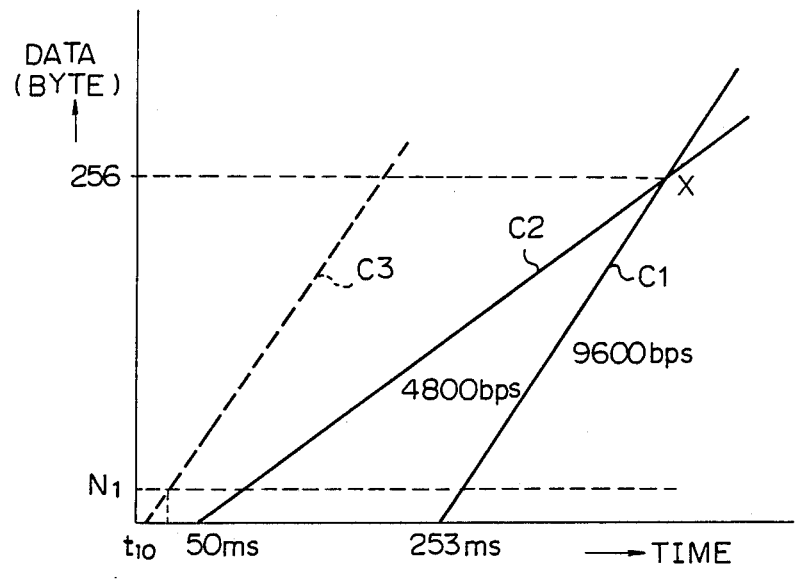
FIG. 5 is a graph representing the transfer time between the MODEMS through the telephone line.

Before describing preferred embodiments of the present invention, an explanation will be given of the prior art for reference.

Referring to FIG. 1, a multipoint type MODEM communication system is represented in a general form. The system includes a center station (CS) containing a host computer (HOST) 100 and a central MODEM 101 connected thereto, a telephone line (LINE) 300 and a plurality of local stations $LS_1$ to $LS_3$. The local station, for example, $LS_1$, contains a data terminal (DTE) 200 and a local MODEM 201 connected thereto. The local MODEMs 201, 211, and 221 are operatively connectable to the center MODEM 101 through the LINE 300. The LINE 300 includes an upstream line and a downstream line and is commonly used for the MODEMs 201, 211, and 221, thereby reducing the line-use fees. The CS sequentially carries out a "POLLING" of the $LS_1$ to $LS_3$ through the downstream line of the LINE 300. Upon receipt of the polling signal, the corresponding LS sends a signal indicating whether or not a data transfer is necessary to the CS through the upstream line of the LINE 300. When a data transfer is necessary, the corresponding LS consecutively transmits signals to the CS through the upstream line. In each local MODEM, as the characteristics of the line from the local MODEM to the central MODEM were measured upon installation, and the reception characteristics of each local MODEM to the central MODEM 101 through the LINE 300 were previously adjusted, the training in each local MODEM may be easily effected in response to the polling carrier signal sent by the CS. Accordingly, the training in the local MODEMs is not the subject of the present invention.

Referring to FIGS. 2a to 2c, signals SIG. 1 to SIG. 3 from the local MODEMs 201 to 221 to the central MODEM 101 are shown. The signals SIG. 1 to SIG. 3 are time-divided. The signal; typically SIG. 1, consists of series of time-divided "SENTENCE" signals each containing the training signal TR and the data DATA. The TR contains information to be used for the training, i.e., adjusting the reception parameters, in the central MODEM 101. The DATA contains standard signals for a MODEM protocol and/or data to be actually transferred from the $DTE_1$ 200 to the HOST 100.

FIGS. 3a and 3b are graphs of a standard CCITT V. 24 interface between the HOST and the central MODEM or the DTE and the corresponding local MODEM. FIG. 3a shows the interface at the sending side, and FIG. 3b the interface of the receiving side. FIGS. 4a to 4e are timing charts of the signals in FIGS. 3a and 3b. Referring to FIGS. 3a, and 3b, and 4a to 4e, the operation in the system of FIG. 1 will be briefly described. The HOST 100 outputs a "REQUEST TO SEND (RS)" signal to the MODEM 101 at a time $t_{11}$. The MODEM 101 outputs the same signal to the corresponding LS through the downstream line of the LINE 300. The corresponding local MODEM, typically MODEM 201, receives the RS signal and transmits the received RS signal to the $DTE_1$ 200. Upon receipt of the RS signal, the $DTE_1$ 200 outputs the TR signal of SIG. 1 to the MODEM 101 through the MODEM 201 and the LINE 300, specially the upstream line. The MODEM 101 starts the training for the $LS_1$ in response to the reception of the TR signal. The MODEM 101 detects a carrier included in the TR signal and outputs a "CARRIER DETECTION (CD)" signal at a time $t_{12}$. Anticipating the completion of the training in the MODEM 101, the MODEM 201 may output a "CLEAR TO SEND (CS)" signal indicating a permission to send to the MODEM 101 at a time $t_{13}$. Upon receipt of the CS signal through the MODEM 101, the HOST 100 outputs a "SEND DATA (SD,)" signal to the MODEM 201 and the $DTE_1$ 200 through the MODEM 101. The MODEM 201 outputs a "SENDING TIMING 2 (ST2)" to the $DTE_1$ 200. Subsequently, the $DTE_1$ 200 outputs the DATA containing the MODEM standard signals and actual data of the SIG. 1 to the MODEM 101 through the MODEM 201. The MODEM 101 outputs a "RECEIVING DATA (RD)" signal and a "RECEIVING TIMING (RT)" signal to the HOST 100, signifying that the DATA from the $DTE_1$ 200 is being received at the HOST 100. After completion of the transfer of the DATA, the HOST 100 makes the RS signal low level. The MODEM 101 also makes the CD signal and the RD signal low level. In response to the change in level of the signals, the MODEM 201 makes the CS signal low level. Accordingly, one "SENTENCE" transfer is completed through the above operation.

In FIGS. 4a and 4b, the time between times $t_{11}$ and $t_{13}$, i.e., from the RS signal to the CS signal, is known as the "RS-CS" time and designates the training time. As described above, the RS-CS time should be within 50 ms for a 4800 bps transfer line and 253 ms for a 9600 bps transfer line, etc.

FIG. 5 is a graph representing the data transfer characteristics. Curve C1 represents the characteristics for a 9600 bps transfer line and curve C2 the characteristics for 4800 bps transfer line. On curve C1, the permissible training time is 253 ms and the transfer time is defined along curve C1 in response to the number of DATA. Note that the transfer time of the 9600 bps line is longer than that of the 4800 bps line when the DATA is less than 256 bytes. This is the paradox mentioned before. In general, the DATA may be $N_1$, for example, several bytes, smaller than 256 bytes. When the training time of the 9600 bps line is still long, as mentioned above, the high speed transfer characteristic is not exhibited. If the training time is shortened to a time $t_{10}$ in FIG. 5, the curve C1 may be shifted to a dotted curve C3 while keeping the same slope as for 9600 bps. In this case, the transfer time of the 9600 bps line for the DATA $N_1$ will become shorter than the time of the 4800 bps line. Accordingly, shortening the training time, i.e., the RS-CS time, is strongly required.

Figure 6:
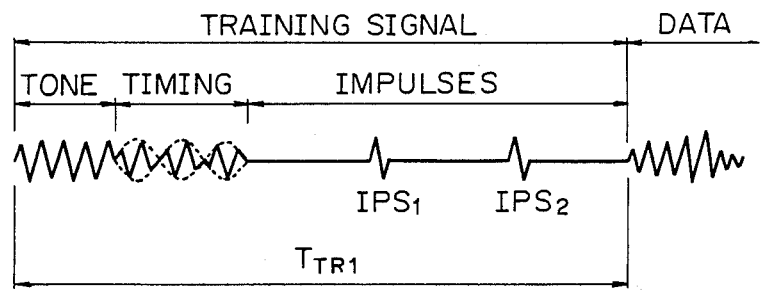
FIG. 6 is a waveform of the training signal of the prior art.

The training and the training signal will now be described in more detail. The receiving MODEM 101 performs a pull-in or set-up operation for the training. The pull-in operation includes a synchronization pull-in, equalization, and carrier phase control, etc. The sending MODEM 201 provides the TR signal including information used for the above operation. Referring to FIG. 6, the training signal as an example of the prior art disclosed in, for example, U.S. Pat. No. 3,962,637, includes a "TONE" signal containing a carrier for performing the automatic gain control and the pull-in of a phase of the carrier, a "TIMING" signal used for adjusting the carrier phase and a pull-in of the sending timing, and an "IMPULSE" signal containing two train impulses $IPS_1$ and $IPS_2$. The first impulse $IPS_1$ is used for controlling a carrier phase, and the second impulse $IPS_2$ is used for the equalization. The distances between the MODEM 101 and the local MODEMs 201 to 221 are different, and, responses of an impulse depend on these distances. Accordingly, the MODEM 101 measures a response of an impulse sent from the local MODEM and judges the line characteristics. That is, the MODEM 101 computes distortion of the first impulse $IPS_1$ and performs a carrier automatic phase control, and similarly, computes distortion of the second impulse $IPS_2$ and also performs the equalization, and thus, carries out a fine-adjusting of a carrier automatic phase controller (CAPC) therein, initial-setting of equalization coefficients to an equalizer (EQL) therein, and resetting of a code-converter also therein. Subsequently, the DATA is received and adjusted by the CAPC, the EQL, etc., ensuring reception of the DATA. In the prior art, a time for training is defined by a maximum distance between the central MODEM 101 and the most remote local MODEM, for example, MODEM 221, and is 30 ms, for a 9600 bps line. Referring back to FIG. 5, the training time $T_{TR1}$ of 30 ms for a 9600 bps line is shorter than the time for a 4800 bps line, and thus is greatly improved. Still, a further shortening of the training time was attempted.

Figure 7A:
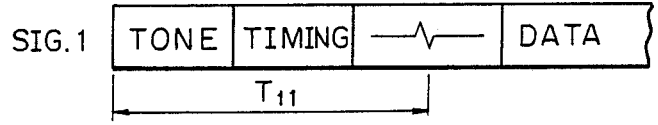
FIGS. 7a to 7c are waveforms of the training signals of another prior art.
Figure 7B:
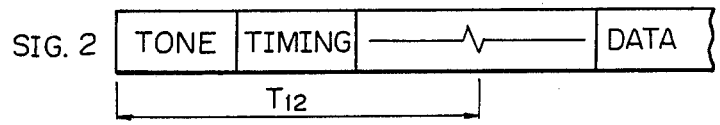
Figure 7C:
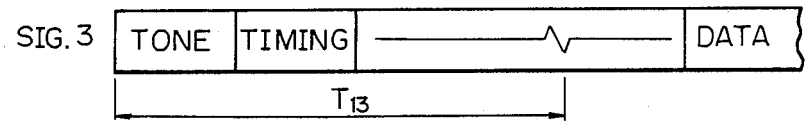

Referring to FIGS. 7a to 7c, other waveforms of the training signals of another prior art are shown. In FIGS. 7a to 7c, the training signal of the signal sent from the local MODEM consists of the tone and the timing, respectively, corresponding to those in FIG. 6, and a single impulse. The impulse is positioned at a time from the beginning of the tone to the impulse, for example, $T_{11}$ in FIG. 7a, defining the distance between the central MODEM 101 and the local MODEM 201. The MODEM 101 measures the time from the beginning of the tone to the impulse and adjusts the parameters therein. The impulses in FIGS. 7a to 7c are respectively used for both the CAPC and th EQL set forth above. In FIG. 6, times between the impulses $IPS_1$ and $IPS_2$ and between the impulse $IPS_2$ and the DATA are defined on the basis of the maximum distance between the central MODEM and the local MODEM, taking into consideration the measurement of the impulse response. Although the times $T_{11}$ to $T_{13}$ in FIGS. 7a to 7c are defined as arbitrary values, a discriminating between them can be carried out. As a result, in the second prior art with reference to FIGS. 7a to 7c, the training time is reduced to 15 ms for the 9600 bps line, a half of the above. The prior art in question, however, suffers from a disadvantage in that an accurate timing adjustment is difficult. This is because the tone and the timing, are not adjusted when they are received, and the received impulse is adjusted to the line characteristic by receiving the tone and the timing and adjusting the parameters using the same, consequently, the detection of the time from the beginning of the tone to the impulse may become vague. Accordingly, the training time can not be made shorter than a predetermined time, i.e., 15 ms for the 9600 bps line. In addition, the prior arts suffer from another disadvantage in that the carrier detection and the pull-in of the AGC are difficult because the tone is a single spectrum of $\pi/\pi$ signals consisting of a pair of signals shifted by 180 degrees relative to each other in a 16 quadrature amplitude modification (QAM) plane, which will be described later.

The present invention will now be described.

Figure 8:
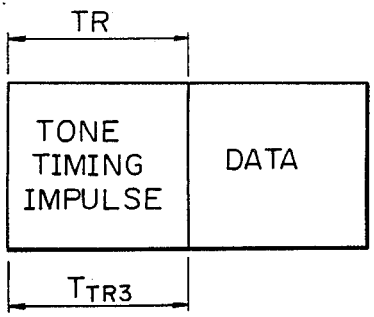
FIG. 8 is a conceptual view of the training signal of an embodiment of the present invention.

FIG. 8 shows a basic scheme of the TR signal of a first embodiment of the present invention. In FIGS. 6 to 7c, the TR signal consists of the series-arranged tone, timing signal, and impulse(s). In FIG. 8, the tone, the timing signal, and the impulses are superimposed upon each other.

Referring to FIGS. 9a to 9d, specific waveforms of the TR signal in FIG. 8 are shown. In FIGS. 9a to 9d, the tone and the timing signal are omitted to simplify the drawings. A signal SIG.A in FIG. 9a includes a TR signal containing a guard impulse $GIP_1$ and first and second impulses $IPS_{11}$ and $IPS_{12}$, and the DATA. A second TR signal in FIG. 9b contains the forward guard impulse $GIP_1$ and two impulses $IPS_{21}$ and $IPS_{22}$ and a reverse guard pulse $GIP_2$. A third TR signal in FIG. 9c contains the forward guard impulse $GIP_1$, two impulses $IPS_{31}$ and $IPS_{32}$, the reverse impulse $GIP_3$, and a scramble pattern Z (SCRZ) consisting of random pattern data. A fourth TR signal in FIG. 9d contains the forward guard impulse $GIP_1$, two impulses $IPS_{41}$ and $IPS_{42}$, the reverse impulse $GIP_4$ and the SCRZ.

The concept of the embodiment is that the local MODEM outputs the corresponding one of the TR signals in FIGS. 9a to 9d, the central MODEM receives the TR signal, recovers the two impulses, for example, $IPS_{11}$ and $IPS_{12}$, and detects a time $T_A$ between the recovered impulses to determine parameters for adjusting the CAPC and the EQL, etc. The times $T_A$, $T_B$, $T_C$, and $T_D$ show a line characteristic defined by the distances between the central MODEM, and the local MODEMS, but do not correspond to the time between the impulses $IPS_1$ and $IPS_2$ in FIG. 6. The times $T_A$ to $T_D$ may be arbitary values sufficient to carry out a discrimination between them.

In FIGS. 9a to 9d, the forward guard impulse $GIP_1$ and the reverse guard impulses $GIP_2$, $GIP_3$ and $GIP_4$ are not essential to the present invention. When the distance between the central MODEM and the local MODEM is short, the guard impulse should not be provided, because line noises and distortion of the signal may be neglected. In this case, the first impulse, for example, $IPS_{11}$, may function as a guard impulse. The central MODEM may easily and correctly recover the impulses and detect the time therebetween. When the distance in question is an intermediate distance, the guard impulse $GIP_1$ should be provided to ensure the reception of the two impulses. When the distance is long, the reverse guard impulse should be provided in addition to the forward guard impulse.

A time between the forward guard impulse and the first impulse, for example, $IPS_{11}$, may be constant. Similarly, a time between the last impulse, for example, $IPS_{22}$ and the reverse impulse $GIP_2$ also may be constant.

The processing of the guard impulses is not described in the following text.

Figure 9A:
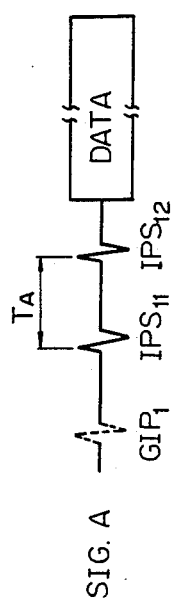
FIGS. 9a to 9d are waveforms of the training signals shown in FIG. 8.
Figure 9B:
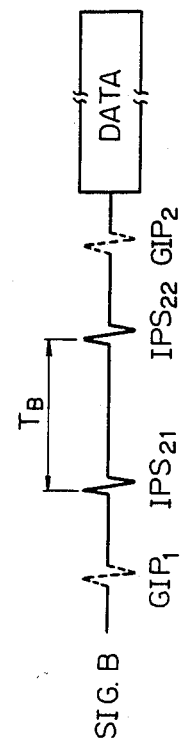
Figure 9C:
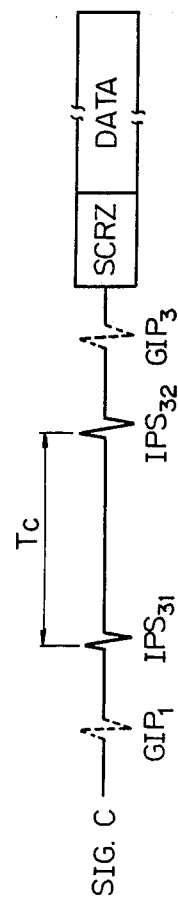
Figure 9D:
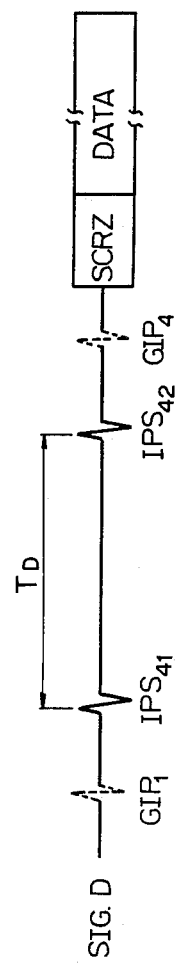

In FIGS. 9c and 9d, the SCRZ may be provided to carry out a fine adjustment of the equalizer.

As set forth above, with reference to FIG. 8, the embodiment will shorten the training time by using the shortened training signal in which the tone, the timing and the impulses, and in addition, the SCRZ, are superimposed. Note, this embodiment will solve the above problems without the provision of a parallel operation of the EQL, the CAPC, etc., which may be easily conceived in the art. In other words, the embodiment will solve the above problems without increasing the cost of the MODEM, as will be disclosed later.

Below, an explanation will be given of the basic nature of MODEM training in embodiments of the present invention, with reference to an example of data transmission between a central station CS and local stations LS shown in FIG. 1.

Figure 10:
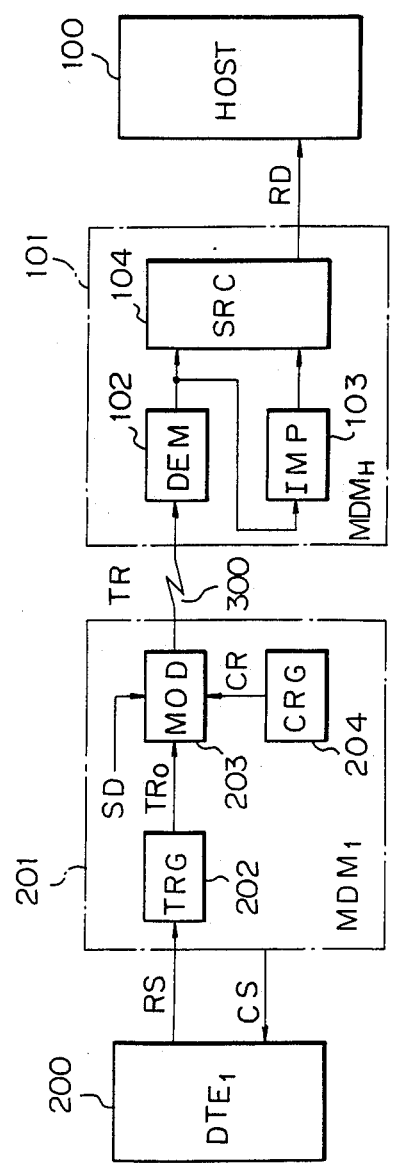
FIG. 10 is a block diagram of MODEMs of an embodiment of the present invention.
Figure 11:
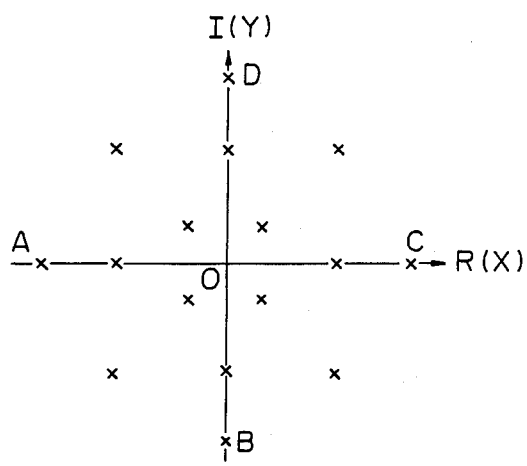
FIG. 11 is a graph representing 16 QAM.
Figure 12A:
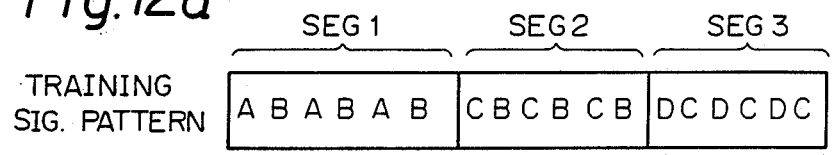
FIGS. 12a and 12b are views showing the training signal pattern of the embodiment.
Figure 12B:
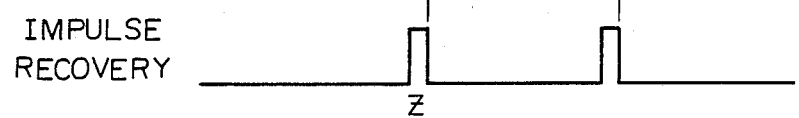
Figure 13:
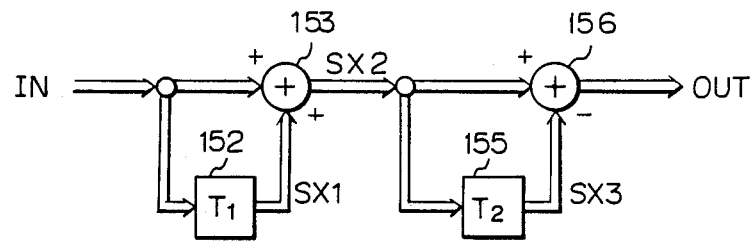
FIG. 13 is a block diagram illustrating the recovery of the impulse.

FIG. 10 is a general schematic view of MODEM of an embodiment of the present invention. FIG. 11 is a graph showing the principle of a 16 QAM. FIGS. 12a and 12b are views for explaining the training pattern in an embodiment of the present invention, and FIG. 13 is a block diagram explaining impulse recovery.

FIG. 10 shows just the transmission unit in a MODEM 201 connected to a data terminal $DTE_1$ 200 and just the reception unit in a MODEM 101 connected to a HOST 100. When the MODEM 201 receives a transmission request signal RS from the $DTE_1$ 200, a training data generator (TRG) 202 generates training data $TR_O$ and supplies the same to a modulator (MOD) 203. The modulator MOD 203 sends a carrier signal CR from a carrier signal generator (CRG) 204 through a transmission route (line) 300 to the MODEM 101 connected to the HOST 100 under quadrature amplification modulation (QAM) based on this training data $TR_O$. The MODEM 101 performs the initialization for data reception based on the received training signal TR. In anticipation of the completion of the initialization, the MODEM 201 issues a transmission enable signal CS and begins to send a signal modulated by the send data SD to the MODEM 101.

The modulator (MOD) 203 of the MODEM 201 performs quadrature amplification to 16 value upon, for example, the carrier signal CR from the carrier generator CRG 204, as shown in FIG. 11. The signal points shown in FIG. 11 correspond to the amplitude and phase of the modulated signals and can be expressed by complex numbers.

The MODEM 101 of FIG. 10 has a demodulator (DEM) 102 for receiving and demodulating a signal transmitted from the MODEM 201, an impulse extraction unit (IMP) 103 for extracting a signal corresponding to an impulse signal from training data demodulated in the demodulator (DEM) 102, and a signal recovery unit (SRC) 104 which extracts RS-CS time data by the time difference of two extracted impulse signals and is subjected to training by the training data and the impulses.

The training pattern is comprised of three segments SEG1, SEG2, and SEG3, as shown in FIG. 12a. Below, an explanation will be made of the pattern of each segment.

The first transmission pattern of the training pattern, i.e., the segment SEG1, preferably satisfies the following conditions: (1) CD detection is easy, (2) AGC (automatic gain control) pull-in can be performed at high speeds (i.e., the data of the line level can be extracted accurately), and (3) there is a timing component. The pattern which satisfies these three conditions is one in which the phase of FIG. 11 is shifted 90 degrees and intersects points A and B of the same amplitude. As the training start pattern of segment SEG1, an "AB" pattern comprised of the six symbols "ABABAB" is used. Conventional tones are single spectrum in nature, so there is no timing component and the $\pi/\pi$ signal (pair of signals shifted 180 degrees in FIG. 11) are insufficient for carrier detection or AGC pull-in.

Next, the segment SEG2 has to be a pattern able to recover the first impulse together with the segment SEG1. On the other hand, the impulse recovery algorithmn at the reception side, i.e., the MODEM 101, delays the input, i.e., received signal, by one symbol's worth of time by the tap T1 152, as shown in FIG. 13.

It obtains the sum with the received signal by the adder A1 153 and further delays this by one symbol's worth of time by the tap T2 155. It then obtains the difference from the added output by the adder A2 156 to recover the impulse. Therefore, the segment SEG 2 is designated as "$X_1 X_2, X_3, X_4, X_5, X_6$" and the optimal symbols for the impulse recovery are determined with reference to FIG. 14. The input IN, comprised of the segments SEG1 and SEG2, is "A,B,A,B,A,B, $X_1, X_2, X_3, X_4, X_5, X_6$". If there is a one-symbol shift at the tap T1 152, it becomes $SX_1$. Therefore, the added output at the adder A1 153 becomes $SX_2$.

Further, if the added output $SX_2$ is shifted one symbol's worth by the tap T2 155, it becomes $SX_3$. When the difference is obtained by the adder A2 156, the output OUT of the difference becomes "A,B,0,0,0,0 $X_1-A, X_2-B, X_3-X_1, X_4-X_2, X_5-X_3, X_6-X_4, -X_5, -X_6$".

Therefore, $X_1$ to $X_6$ for recovery of the first impulse Z of FIG. 12b are determined as follows with reference to the QAM pattern of FIG. 11:

| | |
|---|---|
| $X_1 - A = z$ | $\therefore X_1 = -A$ |
| $X_2 - B = 0$ | $\therefore X_2 = B$ |
| $X_3 - X_1 = 0$ | $\therefore X_3 = -A$ |
| $X_4 - X_2 = 0$ | $\therefore X_4 = B$ |
| $X_5 - X_3 = 0$ | $\therefore X_5 = -A$ |
| $X_6 - X_4 = 0$ | $\therefore X_6 = B$ |

The maximum power of $X_1-A$ is obtained with $X_1=-A$, so is with the point C rotated 180 degrees from the point A in the phase plane of FIG. 11. Therefore, $X_1=X_3X_5-C$. On the other hand, $X_2, X_4, X_6$ is the point B rotated 90 degrees from the point C. In this way, the pattern of the segment SEG2 for recovering the first impulse Z can be found from the "CB" pattern comprised of the six symbols "CBCBCB".

If the segment SEG1 is determined as an "AB" pattern and the segment SEG2 as a "CB" pattern in this way and the segment SEG3 is similarly sought in the same way as above as a pattern enabling recovery of a second impulse with the segment SEG2, then the segment SEG3 becomes a "DC" pattern comprised of six symbols "DCDCDC".

The training pattern becomes as shown in FIG. 11. The patterns in the segments SEG1, SEG2, and SEG3 are comprised of points perpendicularly intersecting in the phase plane in FIG. 11. Among the segments SEG1, SEG2, and SEG3, it should be noted, one of the component points of a former segment is included as one of the component points of a latter segment.

On the other hand, if the segment SEG2 is $X_2-B=Z$ (impulse), the $X_2=B$ and $X_1=A$, $X_3=A$, $X_3=X_2=-B$, $X_5=X_3=A$, $X_5=X_4=D$ and the pattern may be a "DA" pattern comprised the six symbols "DADADA" too. In this case, either the "DC" pattern or the "BA" pattern may be selected for the segment SEG3.

In this way, as shown in FIG. 12a, the segments SEG1, SEG2, and SEG3 are used for the recovery of the second impulse.

The time difference T of the recovered impulse can be varied by the symbol length of the second segment SEG2.

According to this training pattern, a variety of the RS-CS times is possible, as shown in FIGS. 15a to 15c.

In other words, by making the symbol length of the second segment SEG2 of the transmission training pattern of a local station LS1 a close distance away $T_1$, the symbol length of the second segment SEG2 of the transmission training pattern of a local station LS2 a medium distance away $T_2$, and the symbol length of the second segment SEG2 of the transmission training pattern of the local station LS3 a long distance away $T_3$, the parent station can discriminate between the RS-CS times by the time difference $T_1$ to $T_3$ of the recovered impulses.

Further, by adding to the medium distance and long distance local stations LS2 and LS3 a scrambler Z (SCRZ) signal or a binary random signal as a training pattern, it is possible to send a fine adjustment pattern of an automatic equalizer for fine adjustment of the equalizer.

The segments of such a training pattern perpendicularly intersect each other in the phase plane in FIG. 11, so there is no interference among segments and transmission of an impulse is possible in the smallest duration, thus making possible dense impulse transmission.

Further, use is made of the outermost data points of the phase plane in FIG. 11, e.g., point A, point B, point C, and point D, so the maximum signal energy is obtained and the S/N ratio is improved.

Further, since training of an equalizer is possible using the average value of two recovered impulses, the noise resistance characteristics are greatly improved.

This applies not only to the 16 value QAM illustrated in FIG. 10, but also to an 8 value QAM and 4 value QAM.

Next, an explanation will be given of training in the MODEM 101 connected to the HOST 100 which receives the above-mentioned training signal.

Figure 16:
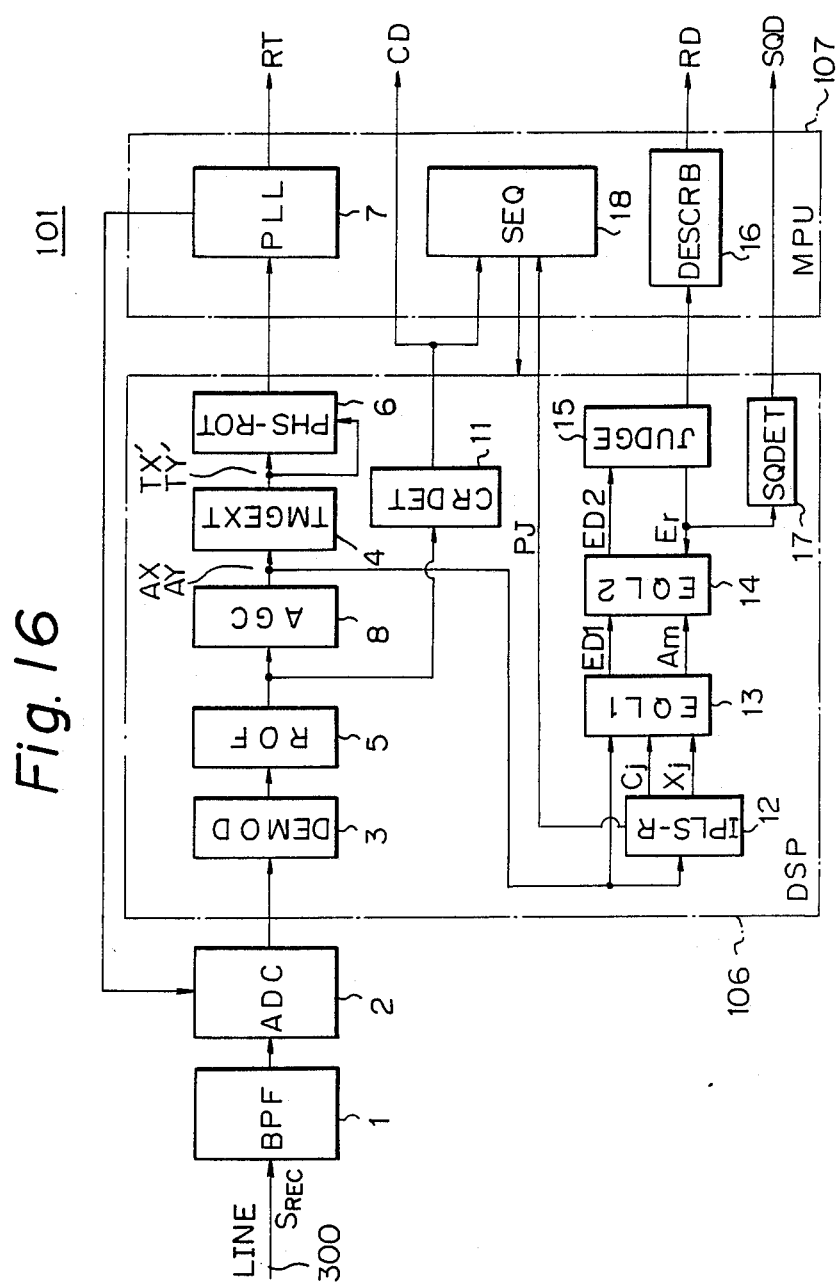
FIG. 16 is a circuit diagram of the MODEM 101 shown in FIG. 10.

FIG. 16 is a constitutional view showing in detail the reception unit, illustrated in FIG. 10, of the MODEM 101 which performs the relevant training. Reference numeral 1 indicates a band pass filter (BPF) which limits the band of the signal received from the line 300. Reference numeral 2 is an analog/digital converter (ADC) which converts the analog signal output from the band pass filter (BPF) 1 at a period of the sampling clock, mentioned later, to a digital received signal. Reference numeral 3 is a demodulator (DEMOD) which demodulates the digital signal received which had passed through the band pass filter (BPF) 1 and been AD converted by the analog/digital converter (ADC) 2. Reference numeral 5 shows a roll-off filter (ROF) which shapes the waveform of the demodulated signal of the demodulator (DEMOD) 3. Reference numeral 8 is an automatic gain controller (AGC) which subjects the output of the roll-off filter (ROF) 5 to automatic gain control to adjust its amplitude. The above-mentioned band pass filter (BPF) 1, analog/digital converter (ADC) 2, demodulator (DEMOD) 3, roll-off filter (ROF) 5, and automatic gain controller (AGC) 8 correspond to the demodulator (DEM) 102 in the MODEM 101 of FIG. 10.

Reference numeral 4 is a timing extraction unit (TMGEXT) which extracts the timing component from the output of the automatic gain controller (AGC) 8. Reference numeral 6 is a phase rotator (PHS-ROT) which pulls in the timing phase at the time of training, holds it, and rotates the timing component extracted by the timing extraction unit (TMGEXT) 4 at the held timing phase upon reception of data. Reference numeral 7 is a phase-lock loop circuit (PLL) which synchronizes the frequency by the rotation timing component of the phase rotator (PHS-ROT) 6. Reference numeral 12 is an impulse recovery unit (IPLS-R), of which details are given later, which recovers the impulse $P_j$ from the automatic equalization adjustment pattern including the impulse component of the time of training, sets the complex conjugate $C_j$ of the recovered impulse $P_j$ as the tap coefficient of a first equalizer, described later, and initializes a second equalizer, also mentioned later. Reference numeral 13 is the first equalizer (EQL1), which fix-equalizes the demodulated signal from the automatic gain controller (AGC) 8 using the set tap coefficient from the impulse recovery unit (IPLS-R) 12. Reference numeral 14 is the second equalizer (EQL2), which automatically equalizes the equalized output of the first equalizer (EGL1) 13, which it receives as input, and issues output data.

Reference numeral 11 is a carrier detector (CRDET) which detects the carrier in the received signal and outputs a carrier detection (CD) signal indicating there is a received signal. Reference numeral 15 is a judgement unit (JUDGE) which judges the data from the equalized output ED2 of the second equalizer (EQL2) 14 and corrects the tap coefficient of the second equalizer (EQL2) 14 by the error Er of the judgement data and the equalized output ED2. Reference numeral 16 is a descrambler (DESCRB) which descrambles the data scrambled at the reception side, i.e., the MODEM 201, restores it to the original transmission data, and outputs it as received data. Reference numeral 17 is a signal quality detector (SQDET) which integrates the error Er from the judgement unit (JUDGE) 15, monitors the quality of the data, and issues signal quality detection (SQD) output. Reference numeral 18 is a sequencer (SEQ) which receives a CD signal from the carrier detector (CRDET) 11, detects that there is a received signal, starts the training operation in the relevant portion in the MODEM 101, and receives the recovered impulse $P_j$ from the impulse recovery unit (IPL-R) 12, extracts the training time from the time difference between impulses, and detects the training time.

The signal recovery unit (SRC) 104 mentioned above with reference to FIG. 10 corresponds to the timing extraction unit (TMGEXT) 4, phase rotator (PHS-ROT) 6, phase-lock loop (PLL) 7, carrier detector (CRDET) 11, sequencer (SEQ) 18, first equalizer (EQL1) 13, second equalizer (EQL2) 14, judgement unit (JUDGE) 15, descrambler (DESCRB) 16, and signal quality detector (SQDET) 17. The impulse extraction unit (IMP) 103 in FIG. 10 corresponds to the impulse recovery unit (IPLS-R) 12.

In FIG. 16, the band pass filter (BPF) 1 and analog/digital converter (ADC) 2 have to be realized by hardware, but with the exception of these, the other portions can be realized, as illustrated, by a digital signal processer (DSP) 106 and a microprocessor (MPU) 107.

Figure 18:
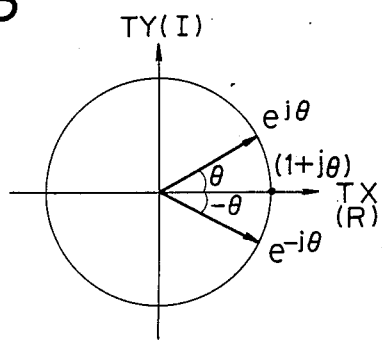
FIG. 18 is a graph explaining the phase rotation in FIG. 16.
Figure 19:
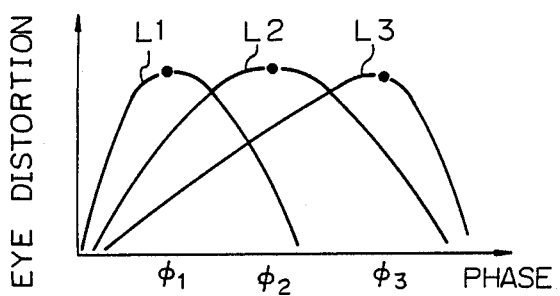
FIG. 19 is a graph illustrating the eye distortion of the prior art.
Figure 20:
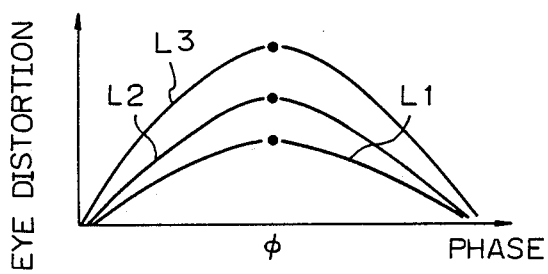
FIG. 20 is a graph illustrating the eye distortion of the embodiment.

Next, an explanation will be given of the operation of the MODEM 101 illustrated in FIG. 16 with reference to views for explaining the operation, given in FIGS. 17a 17f, a view for explaining the phase rotation, given in FIG. 18, and views for explaining pull-in, given in FIGS. 19 and 20.

As the received signal $S_{REC}$, assume one of the same constitution as that shown in FIGS. 15a to 15c is sent from the MODEM 201 of FIG. 10. The training signal TR in the received signal $S_{REC}$ consists of a timing component shown in FIG. 17d and impulse components $IPLS_1$ and $IPLS_2$ shown in FIG. 17e, superposed. Further, the data DATA has the waveform shown in FIG. 17d.

If the MODEM 101 receives the signal $S_{REC}$ given from the MODEM 201 through the line 300, the analog received signal $S_{REC}$ is limited by the band-pass filter (BPF) 1, converted to a digital signal by the analog/-digital converter (ADC) 2, demodulated by the demodulator (DEMOD) 3, and waveform shaped by the roll-off filter (ROF) 5. Using the output from the roll-off filter (ROF) 5, the carrier detector (CRDET) 8 detects the carrier, issues a CD signal, and detects the start of the transmission. Due to this, the sequencer (SEQ) 18 outputs the initialization start instructions to the relevant portions. The sequencer (SEQ) 18 first of all causes the initialization of the automatic gain controller (AGC) 8 by the training signal TR.

Figure 17:
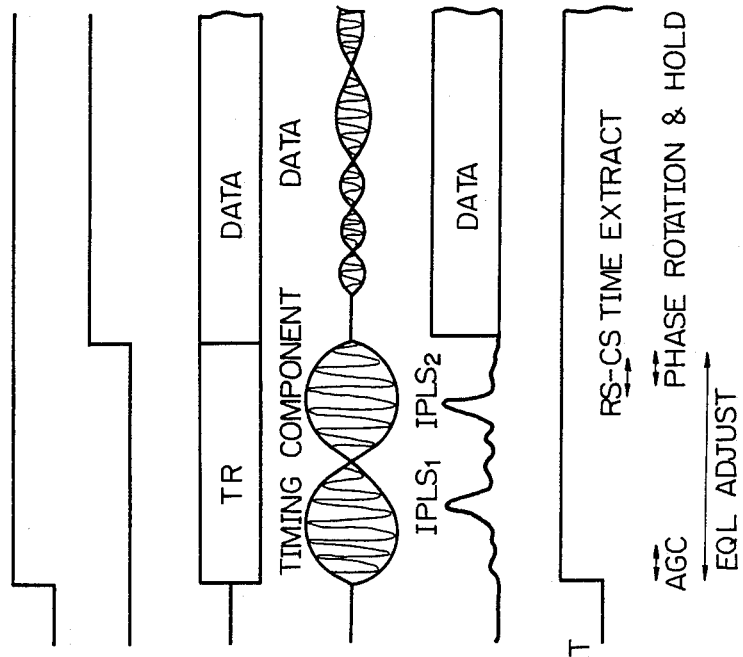
FIGS. 17a to 17f are waveforms of the signals in FIG. 16.

The output of the roll-off filter (ROF) 5 is subjected to automatic gain control by the automatic gain controller (AGC) 8, whereafter its timing component is extracted as shown by FIG. 17d by the timing extraction unit (TMGEXT) 4. From the demodulated output of the AGC 8, the normalized impulse $X_j$ is recovered at the impulse recovery unit (IPLS-R) 12. As explained later, the complex conjugate is found from the normalized impulse $X_j$ and this is set as the tap coefficient $C_j$ into the first equalizer (EQL1) 13. The first equalizer (EQL1) 13 finds the self-correlation series Am, described later, from the normalized impulse $X_j$ and the tap coefficient $C_j$ and sends this to the second equalizer (EQL2) 14 for initialization. On the other hand, the timing component of the timing extraction unit (TMGEXT) is given to the phase rotator (PHS-ROT) 6, the time phase $e^{j\theta}$ is held at the end of the training, the the complex conjugate $e^{-j\theta}$ is held as the phase rotation amount. Therefore, there is a phase rotation of $(1+jO)$ by $e^{-j\theta}$ with respect to the timing component of the phase $e^{j\theta}$ during the reception of the data. These are sequentially controlled by the sequence control of the sequencer (SEQ) 18. The automatic equalization adjustment pattern (training signal) is used for AGC pull-in, timing pull-in, and automatic equalization pull-in.

Based on the two recovered impulses $IPLS_1$ and $IPLS_2$ from the IPLS-R, related as shown in FIG. 17e, the sequencer (SEQ) 18 finds the time differences, extracts the RS-CS time, and, using these, determines the point of time of completion of the training.

The significance behind setting the complex conjugate which the impulse recovery unit (IPLS-R) 12 finds from the first equalizer (EQL1) 13 is as follows: In the impulse recovery unit (IPLS-R) 12, if the impulse series of the input is assumed to be $P_1, P_2, \ldots, P_n$, then the impulse recovery unit (IPLS-R) 12 recovers this impulse series and calculates the tap coefficients $C_1, C_2, \ldots, C_n$ of the first equalizer (EQL1) 13 as below:

$$C_n = \frac{1}{\sqrt{\sum_{i=1}^{n} P_i^2}} \cdot P_n^* \quad (1)$$

where $P_n^*$ is the complex conjugate of $P_n$.

If this tap coefficient $C_n$ is set to the first equalizer (EQL1) 13, since the first equalizer (EQL1) 13, as mentioned later, takes the form of a transversal filter, the equalized output ED is given by the following formula:

$$\begin{aligned} ED &= \sum_{i=1}^{n} C_i \cdot P_i \\ &= \sum_{i=1}^{n} \frac{1}{\sqrt{\sum_{k=1}^{n} P_k^2}} \cdot P_i^* \cdot P_i \\ &= \frac{1}{\sqrt{\sum_{k=1}^{n} P_k^2}} \sum_{i=1}^{n} P_i^* \cdot P_i \end{aligned} \quad (2)$$

Formula (2) indicates that the equalized output ED is an auto-correlation series and that, due to the conjugate related ($P_i^* \cdot P_i$), the phase component part is completely eliminated. That is, the output of the first equalizer (EQL1) 13 is auto-correlative, so an output is obtained which is unrelated with the sampling phase of the analog/digital converter (ADC) 2 of the input in the demodulation. This signifies that the timing pull-in is performed instantaneously. therefore, the first equalizer (EQL1) 13 exhibits auto-correlation without regard to the sampling phase, so, as shown in FIG. 19, the optimal phases 1, 2, and 3 do not change in accordance with the line characteristics $L_1$, $L_2$, and $L_3$, which exhibit conventional phase eye pattern degradation characteristics. As shown in FIG. 20, it is possible to obtain optimal values of the same timing phase $\phi$ without regard to the line characteristics $L_1$ to $L_3$ and setting of the optimal parameters is easy.

Along with this, the first equalizer (EQL1) 13 has the complex conjugate of the impulse response set and fix-equalized, so the second equalizer (EQL2) 14 is a symmetrical equalizer with a symmetrical matrix. Due to this, the second equalizer (EQL2) 14 has initialization of characteristics reverse of those of the temporally asymmetric impulse signal initialized symmetrically with respect to time, so the time required for initialization is shortened. Therefore, the training signal can be shortened and, therefore, the RS-CS time can be greatly reduced.

On the other hand, the timing extraction unit (TMGEXT) 4 extracts the timing component from the results of the demodulation, i.e., the output of the automatic gain controller (AGC) 8, so the timing phase at the time of pull-in must be held and the phase corrected. For this reason, the timing phase $e^{j\theta}$ at the time of pull-in is held by the phase rotator (PHS-ROT) 6, the complex conjugate $e^{-j\theta}$ is obtained, and the extracted timing component of the timing extraction unit (TMGEXT) is phase rotated. As a result, the input of the phase-lock loop (PLL) 7 is continually held at the phase of the time of pull-in and just a frequency follow-up operation can be performed.

In this way, using the training signal, a series of training is performed, i.e., carrier detection, AGC adjustment, timing pull-in, and equalization adjustment. The sequencer (SEQ) 18 obtains the training time, i.e., RS-CS time, based on the rising edge of the carrier detection, using the time difference of the recovered impulses Pj, can determine the completion of the training, and thus enables smooth transfer to the data reception operation.

Further, as mentioned above, the time required for the timing pull-in and equalization adjustment can be shortened, so the training signal can be made shorter and the RS-CS time can be greatly reduced.

A usual data reception operation is performed as follows:

The data signal DATA following the training signal TR is demodulated in the same way as described above by the band-pass filter (BPF) 1, analog/digital converter (ADC) 2, demodulator (DEMOD) 3, roll-off filter (ROF) 5, and automatic gain controller (AGC) 8 and is input to the timing extraction unit (TMGEXT) 4 and the first equalizer (EQL1) 13. At the first equalizer (EQL1) 13, it is fix-equalized by the set tap coefficient $C_j$. The equalized output ED1 is input to the second equalizer (EQL2) 14, where it is automatically equalized, and the equalized output ED2 is judged by the judgement unit (JUDGE) 15. The error Er from the judgement unit (JUDGE) 15 is used for correction of the tap coefficient of the second equalizer (EQL2) 14. The output data from the judgement unit (JUDGE) 15 is descrambled by the descrambler (DESCRB) 16 and is output to the HOST 100 as the received data RD. On the other hand, the timing extraction unit (TMGEXT) 4 extracts the timing component from the demodulated signal from the automatic gain controller (AGC) 8. The phase is rotated by exactly the pull-in phase at the phase rotator (PHS-ROT) 6 and the phase-lock loop (PLL) 7 controlled. As a result, in the phase-lock loop (PLL) 7, the frequency precisely controlled by the phase jitter (the frequency deviation). The sampling clock to the analog/digital converter (ADC) 2 is subjected to slave control and the received timing signal RT is sent to the HOST 100. The operation for reception of a transmitted signal is performed in this way. Further, when the signal quality detector (SQDET) 17 integrates the error Er and the integrated value reaches a predetermined value, the quality degradation signal SQD is sent to the HOST 100, whereupon the HOST 100 evaluates the quality degradation.

Figure 21:
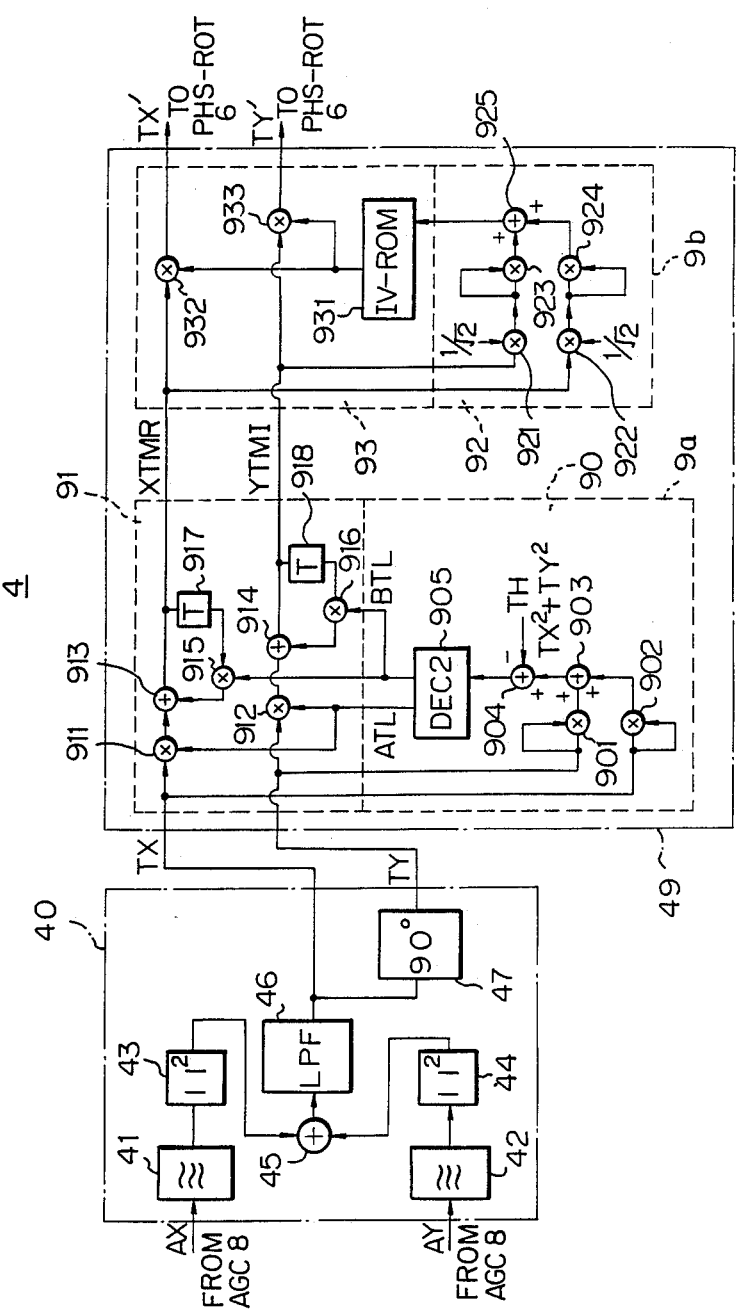
FIG. 21 is a circuit diagram of the timing extraction unit shown in FIG. 16.

FIG. 21 is a detailed circuit diagram of the timing extraction unit (TMGEXT) 4 illustrated in FIG. 16. The timing extraction unit (TMGEXT) 4 is comprised of a timing extractor 40 and a phase holder 49. In the figure, reference numerals the same as those shown in FIG. 16 indicate the same parts. Reference numerals 41 and 42 are timing extraction filters, for example, 1200 Hz band filters, which extract the timing components of the band of the timing signals in the real part and imaginary part AX and AY from the automatic gain controller (AGC) 8. Reference numerals 43 and 44 are squaring circuits which square the output of the filters 41 and 42. Reference numeral 45 is an adder, which adds the outputs of the squaring circuits 43 and 44 and obtains the power of the timing component. Reference numeral 46 is a low pass filter (LPF), for example, a 2400 Hz band pass filter, which eliminates the alternative current component in the signal from the adder 45 and outputs the timing component TX. Reference numeral 47 is a 90 degree component detector, which outputs the Y timing component TY rotated 90 degrees form the X timing component TX of the low pass filter (LPF) 46. A detailed description of the circuit follows.

Reference numerals 901 and 902 are multipliers which square the timing components TX and TY. Reference numeral 903 is an adder, which adds the outputs $TX^2$ and $TY^2$ of the multipliers 901 and 902 to obtain the vector component $TX^2+TY^2$ of the timing components. Reference numeral 904 is a subtractor, which performs subtraction on the vector component $TX^2+TY^2$ and a predetermined threshold TH. Reference numeral 905 indicates a polarity decision unit (DEC2) which determines the polarity of the output $(TX^2+TY^2)$-TH of the subtractor 904 and makes the control output ATL "1" and BTL "0" if the polarity is positive, i.e., $(TX^2+TY^2) \geq TH$, and makes the control output ATL "0" and BTL "1" if the polarity is negative, i.e., $(TX^2+TY^2)<TH$. Reference numerals 911 and 912 are multipliers, which multiply the timing components TX and TY and the control output ATL. Reference numerals 913 and 914 are adders, which add the outputs from the multipliers 911 and 912 and the multipliers 915 and 916 to issue outputs XTMR and XTMI. The multipliers 915 and 916 multiply the outputs of the taps 917 and 918 and the control output BTL and output the results to the adders 913 and 914. The taps 917 and 918 hold the outputs XTMR and YTMI of the adders 913 and 914 and output to the multipliers 915 and 916.

The phase holder 49 is provided so as to replace a small amplitude signal of the timing component with a large amplitude signal of the prior timing component so as to prevent increasing the phase jitter due to frequency adjustment by the small amplitude signal.

The phase holder 49 compares the timing components TX and TY timing extracted at the timing extractor 40 with a predetermined threshold TH. If the timing component is above the threshold TH, the timing component is held. If below the threshold TH, the held timing component is output as the timing data TX' and TY'. Reference numeral 9a is a timing phase hold circuit, which circuit is comprised of a vector judgement unit 90 and a hold unit 91. It compares the timing components TX and TY from the timing extraction unit 40 with the threshold Th. If the vector component is greater than the threshold TH, it holds the timing components TX and TY and then outputs. If lower than the threshold TH, it outputs the held timing components TX and TY as the timing data TX' and TY'. Reference numeral 9b is an amplitude normalizing circuit, which is comprised of a vector component calculator 92 and a normalizer 93. It normalizes the outputs XTMR and XTMI from the timing phase hold circuit 9a to the amplitude of a circle with a radius 1. The circuit will be explained in detail below.

Reference numerals 921 and 922 are multipliers, which multiply the outputs XTMR and XTMI by $1/\sqrt{2}$. Reference numeral 923 and 924 are multipliers which square the outputs of the multipliers 921 and 922. Reference numeral 925 is an adder, which adds the outputs of the multipliers 923 and 924 and obtains the vector component $(XTMR^2+YTMI^2)/2$. Reference numeral 931 is an inverter type read only memory (IV-ROM), which stores inverse numbers of the vector component from the adder 925 and outputs the inverse numbers in accordance with the values of the vector component. Reference numerals 932 and 933 are multipliers, which multiply the inverse outputs of the IV-ROM 931 and the outputs XTMR and YTMI and output the normalized timing components TX' and TY' to the phase rotator (PHS-ROT) 6.

Figure 22:
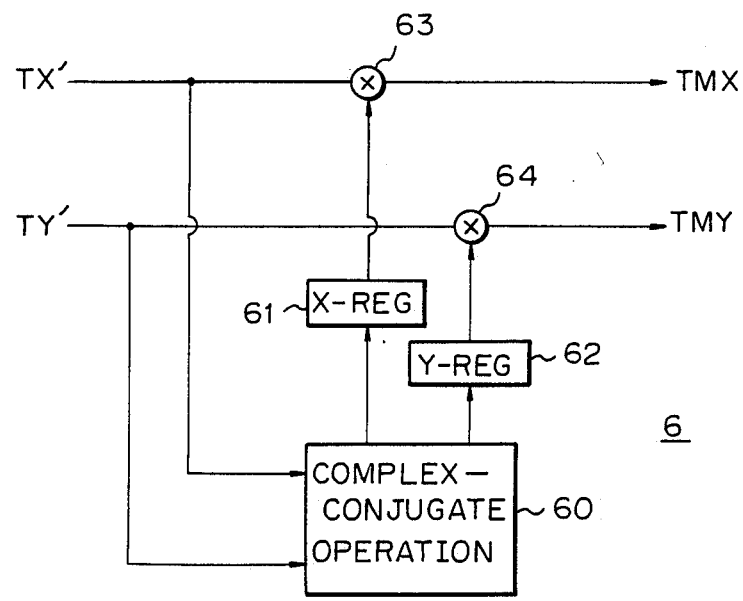
FIG. 22 is a circuit diagram of the phase rotation unit shown in FIG. 16.

FIG. 22 is a detailed circuit diagram of the phase rotator (PHS-ROT) 6 shown in FIG. 16. In the figure, 60 is a complex conjugate calculator, which calculates the complex conjugates $(\sqrt{(TX'^2+TY'^2)}/TX')$ and $(1/TY')$ of the normalized timing components TX' and TY' from the phase holder 49 in the timing extraction unit (TMGEXT) 4 at the time of training. Reference numerals 61 and 62 are X component and Y component registers (X-REG and Y-REG), which store the results of the calculation of the calculator 60, i.e., the complex conjugates ($\sqrt{TX'^2+TY'^2}/TX'$) and ($1/TY'$). Reference numerals 63 and 64 are multipliers, which multiply the normalized timing components TX' and TY' and the composite conjugates of the registers 61 and 62 for phase rotation.

Figure 23:
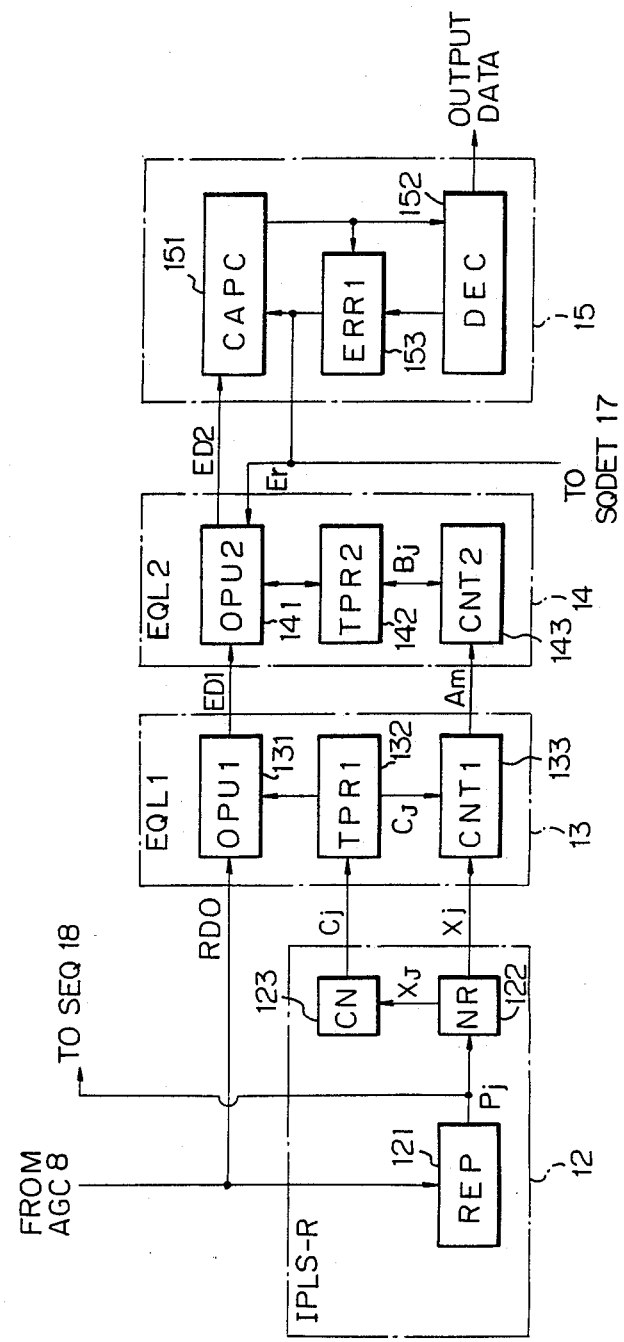
FIG. 23 is a circuit diagram of the judging unit shown in FIG. 16.

FIG. 23 is a detailed diagram of the impulse recovery unit (IPLS-R) 12, first equalizer (EQL1) 13, second equalizer (EQL2) 14, and judgement unit (JUDGE) 15 shown in FIG. 16.

The impulse recovery unit (IPLS-R) 12 has an extraction circuit (REP) 121 for extracting the data series $P_j$ corresponding to the impulse signal from inside the training signal, a normalization circuit (NR) 122 for normalizing the extracted data series, and a complex conjugate circuit (CN) 123 for converting the data series $X_j$ normalized at the normalization circuit (NR) 122 into complex conjugates. The first equalizer (EQL1) 13 has a first equalized output circuit (OPU1) 131, which has received data RD0 from the automatic gain controller (AGC) 8 written in as first tap data and which calculates the first equalized output ED1 from the first tap data and first tap coefficient $C_j$, a first tap coefficient register (TPR1) 132, which is initialized with the first tap coefficient $C_j$ from the complex conjugate circuit 123, and a first calculation control circuit (CNT1) 133, which has the data series from the normalization circuit 122 correlation series $A_m$ of impulse signals. The second equalizer (EQL2) 14 has a second equalized output circuit (OPU2) 141, which has the equalized output data ED1 written in as third tap data and which calculates the second equalized output ED2 from the third tap data ED1 and the second tap coefficient $B_j$, a second tap coefficient register (TPR2) 142, which stores the second tap coefficient $B_j$, and a second calculation control circuit (CNT2) 143, which has the auto-correlation series Am of the impulse from the first calculation control circuit (CNT1) 133 written in, which finds the n-th approximation of the inverse matrix from the auto-correlation series $A_m$, and which calculates the equalized output from the autocorrelation series $A_m$ of the impulse and the second tap coefficient $B_j$ to correct the second tap coefficient $B_j$ based on the error with the reference output Ref. The judgement unit (JUDGE) 15 has a carrier automatic phase control circuit (CAPC) 151, a judgement circuit (DEC) 152, and an error calculation circuit (ERR1) 153.

Figure 24:
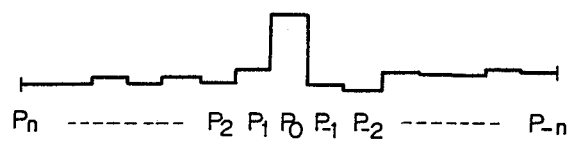
FIG. 24 is a waveform of the impulse recovered in FIG. 16.
Figure 25:
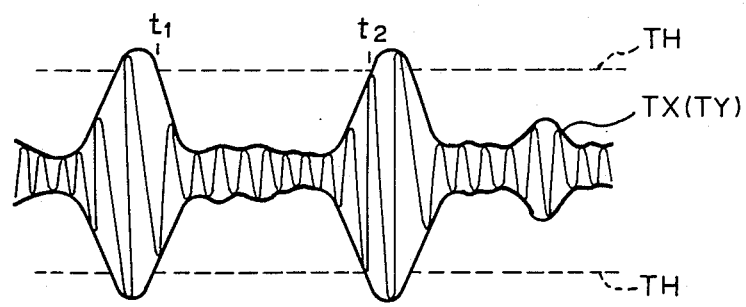
FIGS. 25 and 26 are waveforms explaining the phase hold in FIG. 16.
Figure 26:
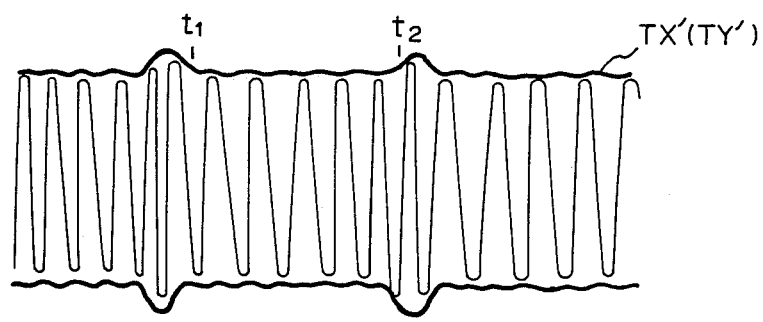
Figure 27:
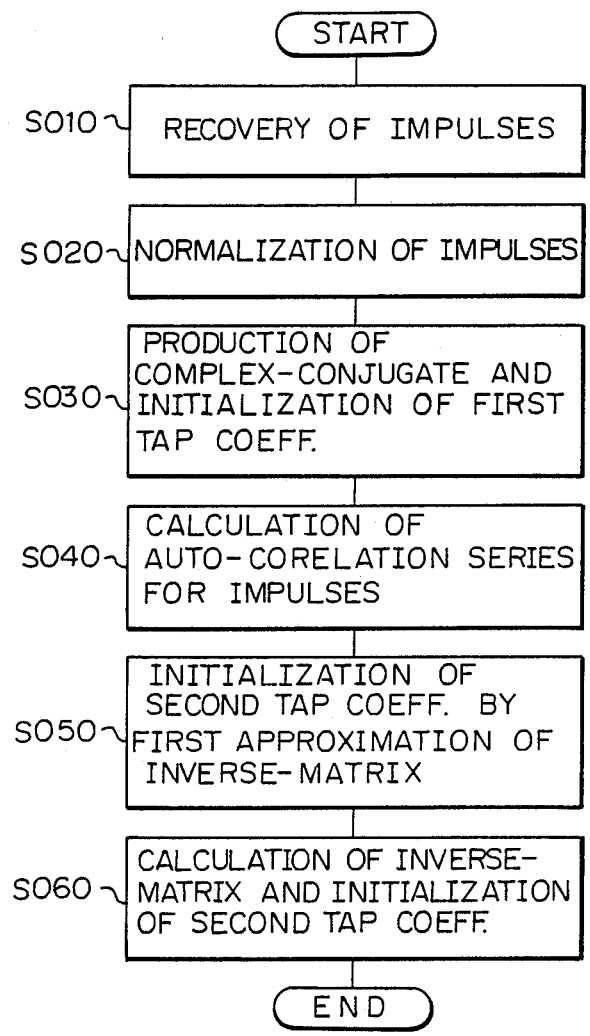
FIG. 27 is a flow chart explaining the operation of the circuit shown in FIG. 16.

FIG. 24 is a waveform chart of the recovered impulse, FIGS. 25 and 26 are views for explaining phase holding, and FIG. 27 is a flow chart of the initialization operation.

First, an explanation will be made of the initialization of the first equalizer (EQL1) 13 and second equalizer (EQL2) 14 with reference to FIG. 24 and FIG. 27.

Step S010

A complex number received data series corresponding to the training signal TR demodulated through the demodulator (DEM) 3, the roll-off-filter (ROF) 5, and automatic gain controller (AGC) 8 is supplied to the impulse extraction circuit (REP) 121, where the impulse series $P_j$ shown in FIG. 23 is recovered by the algorithmn shown in FIG. 12. This impulse series $P_j$ ($j=0, \pm 1, \ldots, \pm n$) is distored by the line 300 as shown in the figure and exhibits the impulse response of the line 300. This recovered impulse series $P_j$ is sent to the sequencer (SEQ) 18 and used as the above-mentioned RS-CS time data.

Step S020

The data series $P_j$ corresponding to the extracted impulse is supplied to the normalization circuit (NR) 122, where it is normalized. The normalization circuit (NR) 122 calculates the magnitude of the data series $P_j$, i.e., the 0th correlation, by the following formula:

$$P^2 = P_n \cdot P_n^* + P_{n-1} \cdot P_{n-1}^* + \ldots + P_0 \cdot P_0^* + \ldots + P_{-n} \cdot P_{-n}^* \tag{3}$$

where, $P_n^*$ is the complex conjugate of $P_n$, i.e., $$P^2 = \sum_{k=-n}^{n} P_K \cdot P_K^* \tag{4}$$

where, $P_k^*$ is the complex conjugate of $P_k$.

Next, the data series $P_j$ is divided by P so as to normalize the impulse. If the normalized data series is $X_j$, $XJ_k$ is given by the following equation:

$$X_j = P_k/P \tag{5}$$

Step S030

The normalized data series $X_j$ is supplied to the complex conjugate circuit (CN) 123. The complex conjugate converted data series $C_j$ is initialized in the first tap coefficient register TP as a tap coefficient $C_j$ of the first equalizer (EQL1) 13.

$$C_j = X_j^* = P_k^*/P \tag{6}$$

In this case, two recovered impulse series $P_j$ are obtained, so a normalized data series $X_j$ averaging the same is found so as to improve the S/N ratio.

Step S040

The normalized data series $X_j$ and the complex conjugate data $C_j$ are supplied to the calculation circuit (CNT) 1 of the first equalizer (EGL1) 13 and the auto-correlation series $A_m$ is calculated. The calculation of the auto-correlation series $A_m$ is performed as follows. First, for the 0th correlation $A_0$, $$A_0 = \sum_{k=-n}^{n} X_K \cdot C_K = \sum_{k=-n}^{n} (P_K/P) \cdot (P_K^*/P) \tag{7}$$
$$= \sum_{k=-n}^{n} P_K \cdot P_K^*/P^2 = (1, 0)$$

The complex numbers are expressed by real parts and imaginary parts. For the remaining $A_m$, $$A_m = \sum_{k=-n}^{n} X_{k+m} \cdot C_K = \sum_{k=-n}^{n} (P_{k+m}/P) \cdot (P_K^*/P) \tag{8}$$
$$= \sum_{k=-n}^{n} P_{k+m} \cdot P_K^*/P^2$$
$$= \sum_{k=-n}^{n} P_{k+m} \cdot P_K^* / \sum_{k=-n}^{n} P_K \cdot P_K^*$$

Here, it is found that $A_{-m} = A_m^*$. In other words, the auto-correlation series $A_m$ is symmetric. The auto-correlation series $A_m$ can be considered to be the result of deformation of the impulse by the line 300 and first equalizer (EQL1) 13. Therefore, in the second equalizer (EQL2) 14, it is required that inverse characteristics of the symmetrical impulse characteristics be given.

Step S050 The auto-correlation series $A_m$ is supplied to the calculation circuit (CNT2) 143 of the second equalizer (EQL2) 14, where the series $B_j^{(1)}$, a primary approximation of the inverse characteristics matrix, is found as follows:

$$B_j^{(1)} = -A_{-j} = -A_j^* \qquad (9)$$

$$B_0^{(1)} = A_0 = (1,0) \qquad (10)$$

The series $B_j^{(1)}$ found in this way is used for finding the inverse matrix as the initial value.

Step S060

The data series $B_j^{(1)}$ obtained in step S050 as the tap coefficient $B_j$ of the second equalizer (EQL2) 14 is used to calculate the equalized output S, with the auto-correlation series $A_m$ as the tap data. The equalized output S is compared with the reference output series Ref and $B_j$ is successively corrected so as to bring the error close to zero.

The equalized output S is the data series $S_l$ given by $$S_l = \sum_{k=-n}^{n} B_K \cdot A_{K+l} \qquad (11)$$

The correction of the tap coefficient $B_j$ is performed using the following successive approximation:

$$\begin{aligned} B_0^{(n+1)} &= B_0^{(n)} + E \cdot A_0^* \\ &= B_0^{(n)} + (Ref - S) \cdot 1 \\ &= B_0^{(n)} + Er \end{aligned} \qquad (12)$$

where, Er is the real part of E.
For the other $B_j$, $$\begin{aligned} B_j^{(n+1)} &= B_j^{(n)} + E \cdot A_0^* \\ &= B_j^{(n)} + E \\ &= B_j^{(n)} + (Ref - S) \\ &= B_j^{(n)} - S_j \end{aligned} \qquad (13)$$

In the correction of $B_j$, the central tap is dominant, so the correction is performed in the follwoing order:

$$B_0 -> B_{\pm 1} -> B_{\pm 2} -> \ldots -> B_{\pm n} -> B_{\pm 1}$$

The data series $B_j$ found in this way is symmetric since the input series $A_m$ is symmetric. In other words, $B_j = B_{-j}^*$. In this way, the tap coefficient $B_j$ of the second equalizer (EQL2) 14 is initialized ans et in the tap coefficient register (TPR2) 242.

With the above steps, the initialization of the tap coefficients $C_j$ and $B_j$ of the automatic equalizer is completed. In other words, the complex conjugate of the impulse response of the line 300 is set in the first equalizer (EQL1) 13 as the tap coeficient $C_j$ and the second equalizer (EQL2) 14 is used an a symmetrical equalizer having a symmetrical matrix as its contents. Since the complex conjugate of the impulse response is set in the first equalizer (EQL1) 13 as a tap coefficient, self-correlation is exhibited. Therefore, output is obtained unrelated to the timing phase and the timing pull-in is performed instantaneously. That is, the output of the first equalizer (EQL1) 13 is one on which timing phase correction is performed.

Next, an explanation will be made of the initialization of the timing recovery with reference to FIGS. 25 and 26.

The received data series of the training signal TR of the afore-mentioned step S010 is input into the timing extraction unit (TMGEXT) 4. At the timing extractor 40 of the timing extraction unti (TMGEXT) 4, the timing components are extracted by the timing extraction filters 41 and 42 of FIG. 20. These are then squared by the squaring circuits 43 and 44 and added by the adder 45, whereafter the power is sought. The alternative current component is cut by the low pass filter 46 and the timing X component TX is obtained. Further, the timing Y component TY is prepared from the timing X component TX by the 90 degree component detector 47. If the timing components TX and TY are given from the timing extractor 40 to the timing phase hold circuit 9a of the timing phase holder 49, the timing components TX and TY are squared by the multipliers 901 and 902 of the vector judgement unit 90. The results are added by the adder 903 and the vector component $(TX^2 + TX^2)$ is obtained. This vector component has subtracted from it the threshold TH by the subtractor 904 and then is applied to the polarity decision unit (DEC2) 905. The polarity decision unit (DEC) 905 makes the control output ATL "1" and the control output BTL "0" if the output of the subtractor 905 is positive, i.e., vector component $(TX^2 + TX^2) > TH$. Therefore, if the vector component is greater than or equal to TH, the timing components TX and TY are outupt from the multipliers 911 and 912 to the adders 913 and 914 as they are. On the other hand, since the control output BTL is "0", the multipliers 915 and 916 do not output to the adders 913 and 914. The timing components TX and TY are therefore output from the adders 13 and 914 as the outputs XTMR and XTMI and held by the taps 917 and 18.

Conversely, the polarity decision unit (DEC) 905 makes the control output ATL "0" and the control output BTL "1" if the vector component $(TX^2 + TX^2)$ is less than TH. Since the control output BTL is "1", the held baclues of the taps 917 and 918 are input into the adders 13 and 914 and the held values of the taps 917 and 918 are output as the outputs XTMR and XTMI of the adders 913 and 914.

Therefore, if the vector component of the timing component as shown in FIG. 25 is greater than or equal to the threshold TH, the timing components TX and TY are output and held. Conversely, if the vector component of the timing component is less than the threshold, the prior held timing component is output.

The outputs XTMR and YTMI are applied to the circuit 9 for normalizing the amplitude and are multiplied by $1/\sqrt{2}$ by the multipliers 921 and 922 of the vector component calculator 92. Further, they are squared by the multipliers 923 and 924 and added by the adder 925. In this way, the vector component $(XTMR^2 + YTMI^2)/2$ is obtained.

The IV-ROM 931 outputs the inverse numbers of the cvector component. The outputs XTMR and YTMI are multiplied with the inverse numbers by the multipliers 932 and 933, whereby the timing data TX' and TY' shown in FIG. 18 with the radius 1 are obtained.

Therefore, the portion from the time $t_1$ to the time $t_2$ of FIG. 25 below the threshold is replaced by the timing component of the time $t_1$ above the threshold as shown in FIG. 26. In other words, the portion below the threshold the phase of the prior timing component is held and output. The timing phases during that time become the same even if they were actually different. During this time, desynchronization occurs and the phase jitter increases, but the time where the timing component is small does not continue long and further the phase fluctuation during that time is small, so substantially the minimum phase jitter can be obtained. Since the timing component is small, even if a synchronization operation is performed, synchronization may not be possible or the synchronization operation may be erroneous, so the phase jitter can become large.

This timing data TX' and TY' is input to the phase rotator PHS-ROT) 6. As previous mentioned, during the training, the complex conjugate calculator 60 takes the complex conjugate values of the timing data TX' and TY' and sets them into the registers 61 and 62.

In this way, in anticipation of the completion of the initialization in the MODEM 101, the MODEM 201 commences the transmission of the send data. At the MODEM 101, the received data signal is demodulated to the data series by the demodulator (DEMOD) 3 and supplied to the first equalizer 9EQL1) 13. In the first equalizer (EQL1) 13, the received data series is processed by the equalized output circuit (OPU1) 131 of FIG. 23 using the tap coefficient $C_j$ of the tap coefficient register (TPR1) 132 to calculate the first equalized output ED1. The equalized output data series ED1 from the first equalizer (EQL1 13) is suppleid to the equalized output circuit (OPU2) 141 of the second equalizer (EQL2) 14, where the second tap coefficient $B_j$ is used to calculate the final equalized output data ED2. Further, the equalized output ED2 is judged as to data by the judgement unit (JUDGE) 15 and output as output data. Further, the error between the output data and the equalized output ED2 is used, via the second equalized output circuit (OPU2) 141, to correct the second tap coefficients $B_j$ of the second tap coefficient register (TPR2) 142.

The above-mentioned demodulated data series is input to the timing extractor 40 of the timing extraction unit (TMGEXT) 4, where the timing components TX' and TY' are extracted. These are then amplitude corrected at the phase holder 49, normalized, and input to the phase rotator (PHS-ROT) 6. At the phase rotator (PHS-ROT) 6, the normalized timing components TX' and TY' are multiplied by the multipliers 63 and 64 with the complex conjugates of the registers 61 and 62 for phase rotation and control of the phaselock loop (PLL) 7. At the phase-lock loop (PLL) 7, the phase jitter is adjusted.

In the above, a description of the general training was given. The timing signals have the waveforms shown in FIGS. 9a to 9d. The training time is 7.5 ms for the signal SIG.A in FIG. 9a, 15 ms for SIG.B in FIG. 9b, 30 ms for SIG.C in FIG. 9c, and 60 ms for SIG.D in FIG. 9d, with respect to a 9600 bps line. The training time corresponding to the prior arts is 7.5 ms. Other training times are those needed when there is a very long distance between the central MODEM and th elocal MODEM.

Figures 28, 29:
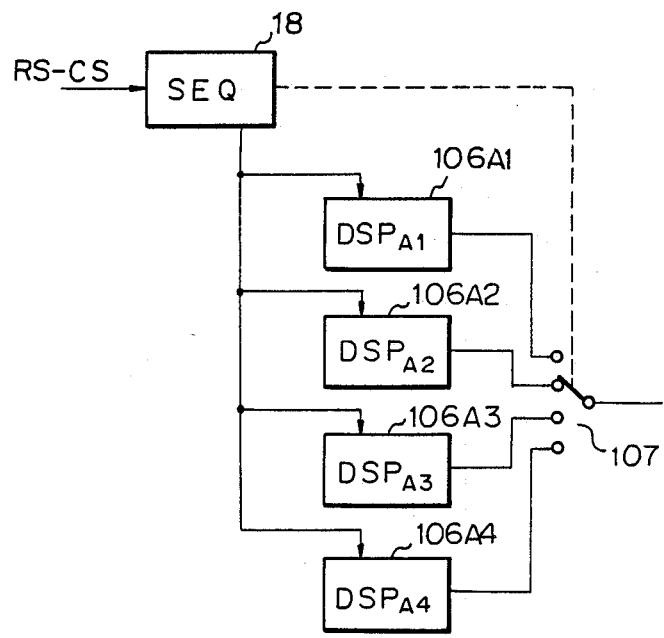
FIG. 28 is a table explaining the variety of trainings.
FIGS. 29 and 30 are block diagrams of the training portions in the MODEM 101 in FIG. 16.

Referring to FIG. 28, the table shows the operation of the training signals SIG.A to SIG.D. Referring to FIG. 29, when the SEQ 18 receives the RS-CS time, the SEQ 18 activates one of the digital signal processors 106A1 to 106A4 and switches a switch 17 to the activated digital processor. The digital processor 106A1 processes the SIG.A, the digital processor 06A2 the SIG. B, the digital processor 06A3 the SIG.C, and the digital processor 106A4 the SIG.D. Each digital processor has the function described above.

Figure 30:
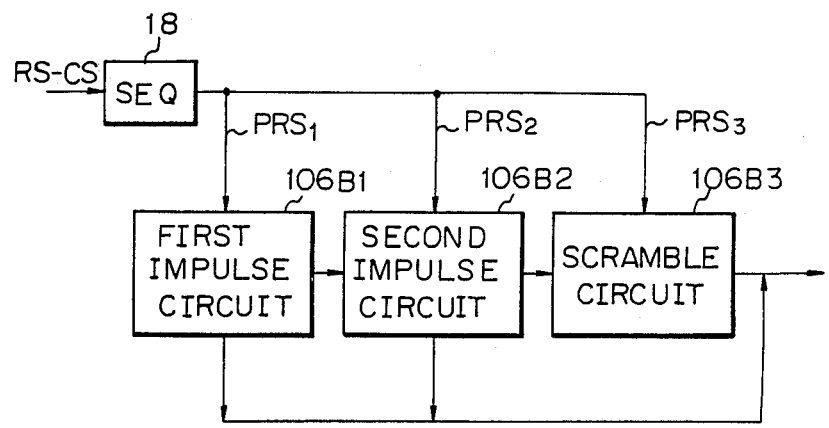

FIG. 30 shows another processor. In FIG. 30, when the SEQ 18 receives the RS-CS time, the SEQ 18 sets parameters $PRS_1$ to $PRS_3$ to a first impulse circuit 106B1, a second impulse circuit 106B2, and a scramble circuit 106B3. If the RS-CS time indicates the SIG.B, the parameters $PRS_1$ and $PRS_2$ are set to the first and second impulse circuits 106B1 and 106B2, and the circuits 106B1 and 106B2 are energized. Initially, the first impulse circuit 106B1 processes the first impulse, and subsequently, the second impulse circuit 106B2 processes the second impulse and terminates the training. Other signal processings may be performed in the same way. The circuit shown in FIG. 30 is beneficial to the circuit shown in FIG. 29 because of the economical construction thereof.

As explained above, according to this embodiment, the relative time difference between two recovered impulses is used to indicate the RS-CS time and other predetermined data. Therefore, variations in CD detection have no effect and therefore the CS time can be shortened. Further, since two impulses can be recovered, the equalization pull-in can be performed by the average of the two, thus enabling optimal equalization pull-in (training).

In particular, no special AGC adjustment pattern or timing pull-in pattern need be provided, so the RS-CS time can be shortened to a great degree. This in particular enables considerable improvement of the line efficiency of MODEM's of the fast polling type.

Figure 31:
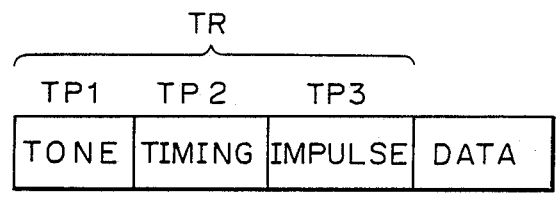
FIG. 31 is another conceptual view of the training signal of another embodiment of the present invention, corresponding to FIG. 8.

FIG. 31 shows another basic scheme of the TR signal of another embodiment of the present invention. Compared to the scheme in FIG. 8, the scheme is FIG. 31 includes first to third training signals TP1 to TP3 forming the TR signal. The first training signal TP1 is a tone, as shown in FIG. 6 and FIGS. 7a to 7c. The second training signal TP2 is a timing signal, also shown in FIGS. 6 to 7c. The third training signal TP3, however, includes the impulses and the scramble, as shown in FIGS. 9a to 9d. This provision of the first and second training signals TP1 and TP2 in series to the TR signal is beneficial for use of the prior circuit and ease of the training. On the other hand, the series provision may result in a longer training time, compared to the above embodiment. Note, however, that the essence of the present invention wherein the two train impulses, for example, $IPS_{11}$ and $IPS_{12}$ in FIG. 32a, define the line characteristics and the major adjustment of the MODEM is effected by using the impulses, is still maintained. The SCRZ is also used.

Referring to FIGS. 32a to 32d, waveforms of signals SIG.A1 to SIG.D1 are shown. In FIGS. 9a to 9d, the impulses, for example, $IPS_{11}$ and $IPS_{12}$, are superimposed on the tone and the training signal. In FIGS. 32a to 32d, the impulse signal TP3 is not superimposed on the tone TP1 and the timing signal TP2.

Figure 33:
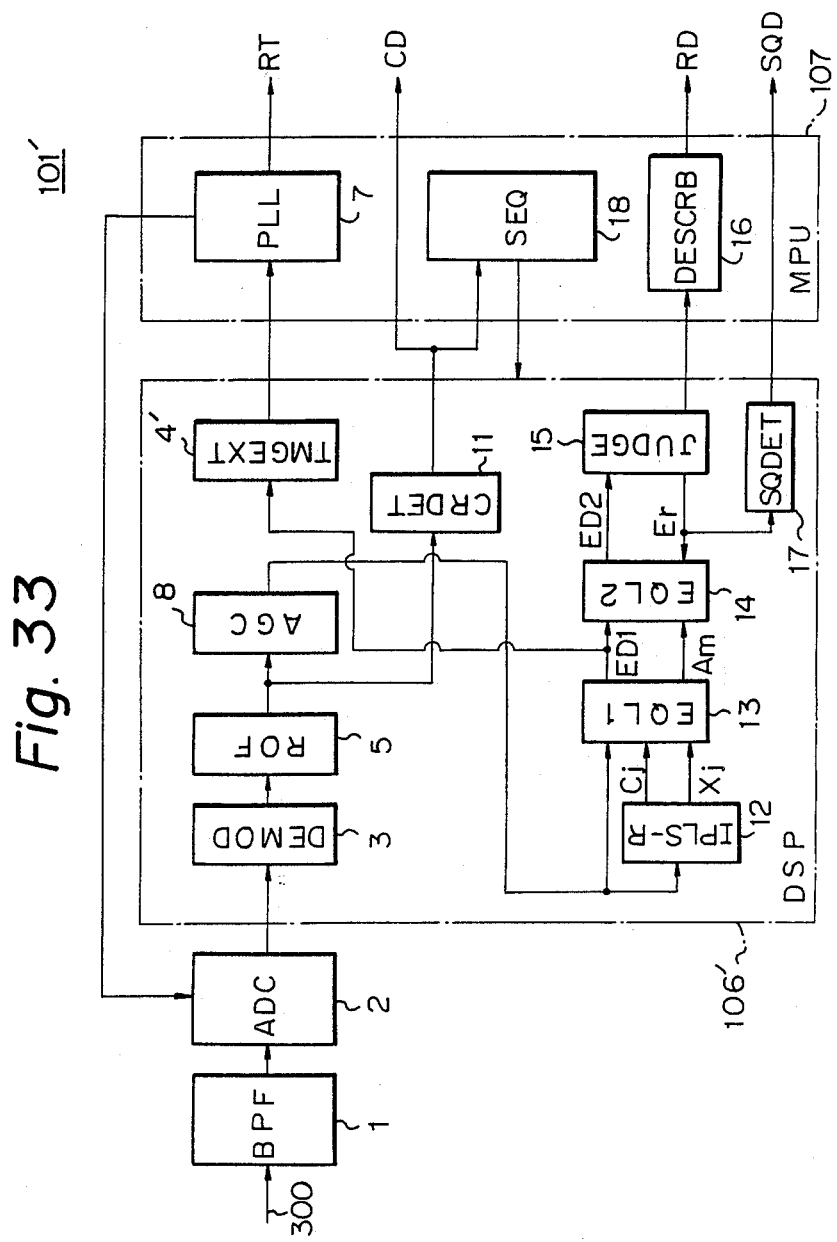
FIG. 33 is a circuit diagram of another embodiment, corresponding to FIG. 16.

FIG. 33 is a structural view of another embodiment of the present invention. In the figure, portions the same as those shown in FIG. 16 are indicated by the same references. In this embodiment, no phase rotator (PHS-ROT) 6 is provided, as opposed to the MODEM of FIG. 16. The timing extraction unit (TMG-EXT) 4 is designed to perform the timing recovery from the equalized output ED1 of the first equalizer (EQL1) 13. Further, in this embodiment, the processing of the digital signal processor DSP and the microprocessor MPU are shown in the same way as in FIG. 16.

The timing extraction unit (TMGEXT) 4 is the same as in FIG. 21. The impulse recovery unit (IPLS-R) 12, the first equalizer (EQL1) 13, the second equalizer (EQL2) 14, and the judgement unit (JUDGE) 14 are the same as in FIG. 23.

The initialsetting in this embodiment may be just the afore-mentioned initialization of the first equalizer (EQL1) 13 and the second equalizer (EQL2) 14, by which timing pull-in and equalization pull-in training are performed. The timing extraction unit (TMGEXT) 4' of FIG. 33 performs timing recovery from the equalized output ED1, from which the phase component has been erased, during the data reception, so no phase rotation is necessary. Therefore, the phase-lock loop (PLL) 7 is adjusted as to phase jitter by the output of the timing extraction unit (TMGEXT) 4.

In this embodiment, compared with the aforementioned embodiment, there is the advantage that no initialization for the phase rotation or rotation operation are required. However, at a transmission speed of 9600 Baud the first equalizer (EQL1) 13 must process at 9.6 kHz. Higher speed processing is sought compared with the construction of FIG. 15. Further, there are sometimes delay effects due to the first equalizer (EQL1) 13.

Figure 34A:
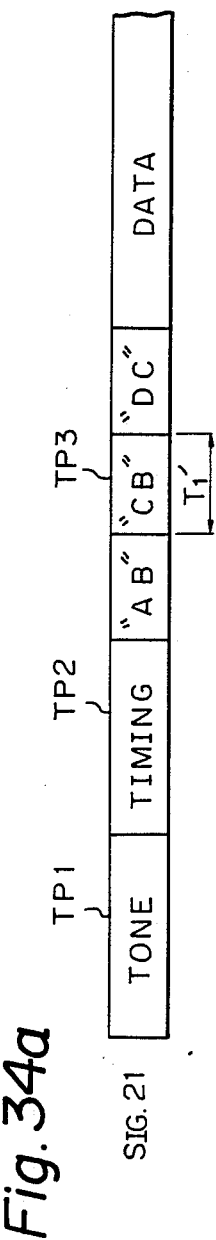
FIGS. 34a to 34c are views of the training signal patterns of the another embodiment of FIG. 33, corresponding to FIGS. 15a to 15c.
Figure 34B:
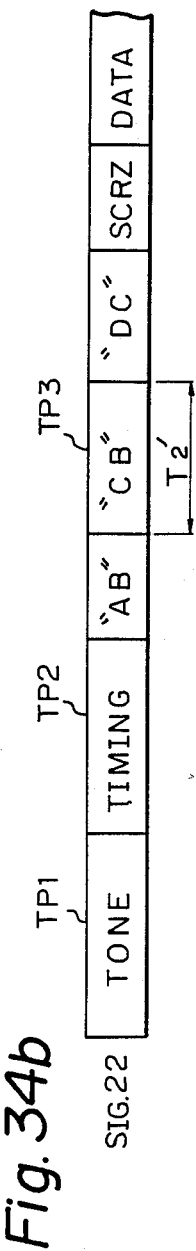
Figure 34C:
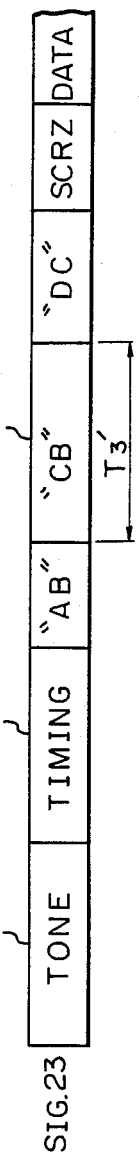

FIGS. 34a to 34c show the training signals TR of the second embodiment. In the embodiment, as opposed to the conventional training signals TR explained with respect to FIG. 4c, the training pattern explained with respect to FIGS. 12a and 12b and FIGS. 15a to 15c is provided as the third pattern TP3. The first pattern TP1 is used for the carrier detection and AGC adjustment, and the second pattern TP2 is used for the timing pull-in. The third pattern TP3 is used for training of the automatic equalization adjustment (initialization), and the two recovered impulses are used for obtaining the RS-CS time data. Therefore, the third pattern TP3 must always be one including a timing component. It need not be one facilitating carrier detection, but should be one enabling acquisition of two recovered impulses shifted in time.

In this case too, the third pattern TP3 shows the RS-CS time by a time difference of recovered impulses, so, compared with the conventional third pattern TP3, the time difference of the impulses may be the minimum recognizable value. Therefore, there is no need to provide an excess length and the training time, i.e., the RS-CS time, can be shortened. Further, since the automatic equalization adjustment can be performed by the average value of recovered impulses, the S/N ratio can also be improved.

Further, there is the merit that, compared with the structure shown in FIG. 7, use can be made of conventional training algorithmns and the system can be easily applied to a conventional MODEM receiver unit just by changing the training pattern.

Further, in the construction shown in FIG. 16, by eliminating the phase rotator (PHS-ROT) 6 and replacing it with a phase decision unit and using the second pattern TP2 for creating phase jitter in the phase-lock loop (PLL) 7 by the phase decision unit for performance of timing pull-in, the effects of FIG. 33 can be realized by the construction of FIG. 16. The operation of the SEQ 18 and the initialization of the equalizers (EQL1) 13 and (EQL2) 14 are the same as those shown in FIG. 16 and FIG. 27.

As explained above, according to this embodiment, like with the prior embodiment, the relative time difference between two recovered impulses is used to express the RS-CS time and other predetermined data, so variations in the CD detection have no effect and thus the RS-CS time can be shortened. Further, since two impulses can be recovered, the equalization pull-in can be performed by their average values and thus optimal equalization pull-in (training) can be performed.

In particular, this system has the advantage of being applicable without changing conventional constructions and training algorithmns, so can be easily realized. Many widely different embodiments of the present invention may be constructed without departing from the spirit and scope of the present invention. It should be understood that the present invention is not limited to the specific embodiments described in this specification, except as defined in the appended claims.

We claim:

1. A modulator and demodulator (MODEM) communication system comprising:
   telephone line means, having a telephone line, for carrying signals;
   a central station including a MODEM and operatively connected to said telephone line through said MODEM; and,
   one or more local stations each including another MODEM, and each operatively connected to said telephone line through said another MODEM and to said central station through said another MODEM, said telephone line and said MODEM, said MODEM carrying out a polling of said another MODEMs, the corresponding another MODEM undergoing said polling and sending a signal having a training signal and data to said MODEM, said training signal sent from said another MODEM comprising the superimposition of a carrier, a timing signal and at least two impulses, a time between said two impulses defining a characteristic of said telephone line between said corresponding another MODEM and said MODEM, said MODEM including first means for receiving and demodulating said signal having said training signal, second means for recovering said impulses and for performing an equalization and a carrier phase control in response to said recovered impulses, and said data contained in said signal sent from said corresponding another MODEM being adjusted in response to said gain control, synchronization, equalization and carrier phase control.

2. A MODEM communication system according to claim 1, wherein said training signal further contains a forward impulse prior to said impulses, for guarding said impulses.

3. A MODEM communication system according to claim 2, wherein said training signal further contains a scramble signal having a random pattern data after said impulses.

4. A MODEM communication system according to claim 3, wherein said training signal further contains a reverse impulse between the last impulse of said impulses and said scramble signal.

5. A MODEM communication system according to claim 1, wherein said second means of said MODEM comprises means for detecting said carrier, means for controlling a gain, means for extracting said timing signal, and means for rotating a phase of said extracted timing signal, and wherein a third means of said MODEM comprises means for recovering said received impulses, means for equalizing a characteristic sent to said another MODEM, and means for controlling a carrier phase sent to said another MODEM.

6. A MODEM communication system according to claim 1, wherein said signal sent from said another MODEM is quadrature-amplitude-modified.

7. A method for training a MODEM in a MODEM communication system including telephone line means having a telephone line, a central station including a MODEM operatively connected to said telephone line and one or more local stations each including another MODEM operatively connected to said telephone line, comprising the steps of:

polling from said MODEM in said central station to said another MODEMs in said local stations through said telephone line;

sending a signal having a training signal, comprising the superimposition of a carrier, a timing signal and at least two impulses superimposed on each other and data, from said polled MODEM to said MODEM through said telephone line, a time between said impulses defining a characteristic of said telephone line between said polled MODEM and said MODEM;

receiving and demodulating said training signal in said MODEM;

detecting said carrier and said timing signal in said MODEM to adjust a gain and to pull-in synchronization to said polled MODEM; and recovering said impulses and performing an equalization and carrier phase control in response to said time of said recovered impulses.

8. A method for training a MODEM according to claim 7, wherein said training signal further contains a forward impulse prior to said impulses, for guarding said impulses.

9. A method for training a MODEM according to claim 8, wherein said training signal further contains a scramble signal having a random pattern data after said impulses.

10. A method for training a MODEM according to claim 9, wherein said training signal further contains a reverse impulse between said impulses and said scramble signal.

11. A method for training a MODEM according to claim 9, further comprising the step of discriminating said scramble signal and adjusting said equalization and carrier phase control.

12. A MODEM communication system according to claim 7, wherein said signal sent from said polled MODEM is quadrature-amplitude-modified.

* * * * *